United States Patent
Rose

(10) Patent No.: US 10,725,153 B2
(45) Date of Patent: Jul. 28, 2020

(54) PARTITIONING FOR RADAR SYSTEMS

(71) Applicant: Evolv Technologies, Inc., Waltham, MA (US)

(72) Inventor: Alec Rose, West Hartford, CT (US)

(73) Assignee: Evolv Technologies, Inc.

(*) Notice: Subject to any disclaimer, the term of this patent is extended or adjusted under 35 U.S.C. 154(b) by 164 days.

(21) Appl. No.: 15/697,722

(22) Filed: Sep. 7, 2017

(65) Prior Publication Data

US 2018/0017667 A1 Jan. 18, 2018

Related U.S. Application Data

(63) Continuation of application No. 14/678,566, filed on Apr. 3, 2015, now Pat. No. 9,791,553.

(Continued)

(51) Int. Cl.
*G01S 7/41* (2006.01)
*G01S 13/88* (2006.01)
*G01S 15/89* (2006.01)
*G01S 13/89* (2006.01)
*G01S 7/35* (2006.01)

(Continued)

(52) U.S. Cl.
CPC .............. *G01S 7/41* (2013.01); *G01S 7/35* (2013.01); *G01S 13/887* (2013.01); *G01S 13/89* (2013.01); *G01S 15/89* (2013.01); *G06T 15/04* (2013.01); *G06T 15/08* (2013.01); *G06T 15/10* (2013.01); *H01Q 21/00* (2013.01); *G01S 7/04* (2013.01); *G01S 13/888* (2013.01); *G06K 9/3241* (2013.01)

(58) Field of Classification Search
CPC . G01S 7/41; G01S 7/35; G01S 13/887; G01S 13/89; G01S 15/89; G01S 7/04; G01S 13/888; G06T 5/04; G06T 15/08; G06T 15/10; H01Q 21/00; G06K 9/3241
USPC .......................................................... 342/424
See application file for complete search history.

(56) References Cited

U.S. PATENT DOCUMENTS 5,592,599 A * 1/1997 Lindholm ............... G06T 3/005
345/427
5,880,736 A * 3/1999 Peercy .................... G06T 15/04
345/426

(Continued)

FOREIGN PATENT DOCUMENTS

CN 102938142 A 2/2013
WO WO-2013/059358 A2 4/2013
WO WO-2013059358 A2 * 4/2013 .............. A61N 7/00

OTHER PUBLICATIONS

Boag, Amir. "A fast multilevel domain decomposition algorithm for radar imaging." IEEE Transactions on Antennas and Propagation 49.4 (2001): 666-671.

*Primary Examiner* — Bernarr E Gregory
*Assistant Examiner* — Nuzhat Pervin
(74) *Attorney, Agent, or Firm* — Mintz Levin Cohn Ferris Glovsky and Popeo, P.C.

(57) ABSTRACT

Data is received characterizing a plurality of measurements for a scene received by a plurality of sensor elements forming a sensor array. A plurality of scene sub-domains is mapped to the plurality of sensor elements. A plurality of voxels associated with one of the plurality of scene sub-domains is mapped to a plurality of measurement sub-domains. One or more scattering coefficients of the scene is determined by applying the mapping to the received data. Related apparatus, systems, techniques, and articles are also described.

26 Claims, 14 Drawing Sheets

Related U.S. Application Data

(60) Provisional application No. 61/974,775, filed on Apr. 3, 2014.

(51) Int. Cl.

| | | |
|---|---|---|
| *G06T 15/04* | (2011.01) | |
| *G06T 15/08* | (2011.01) | |
| *G06T 15/10* | (2011.01) | |
| *H01Q 21/00* | (2006.01) | |
| *G01S 7/04* | (2006.01) | |
| *G06K 9/32* | (2006.01) | |

(56) References Cited

U.S. PATENT DOCUMENTS

| | | | | |
|---|---|---|---|---|
| 5,920,285 A * | 7/1999 | Benjamin | H01Q 21/08 | 342/22 |
| 6,005,916 A * | 12/1999 | Johnson | A61B 5/05 | 378/87 |
| 6,215,496 B1 * | 4/2001 | Szeliski | G06T 15/04 | 345/419 |
| 6,697,660 B1 * | 2/2004 | Robinson | A61B 5/04005 | 324/248 |
| 8,692,708 B2 * | 4/2014 | Nogueira-Nine | G01K 11/006 | 342/179 |
| 8,803,513 B2 * | 8/2014 | Hosek | G01B 7/003 | 324/207.15 |
| 9,933,245 B2 * | 4/2018 | Jensen | G01B 9/0205 | |
| 2002/0085219 A1 * | 7/2002 | Ramamoorthy | G06T 15/10 | 358/1.9 |
| 2002/0130804 A1 * | 9/2002 | McMakin | G01S 7/20 | 342/22 |
| 2004/0090359 A1 * | 5/2004 | McMakin | G01S 7/41 | 342/22 |
| 2004/0140924 A1 * | 7/2004 | Keller | G01N 21/3581 | 342/22 |
| 2004/0252870 A1 * | 12/2004 | Reeves | G06T 7/0012 | 382/128 |
| 2005/0190180 A1 * | 9/2005 | Jin | H04N 13/122 | 345/419 |
| 2006/0066469 A1 * | 3/2006 | Foote | G06T 7/149 | 342/22 |
| 2006/0164285 A1 * | 7/2006 | Fleisher | G01S 13/887 | 342/22 |
| 2006/0164286 A1 * | 7/2006 | Nikulin | G01S 13/89 | 342/22 |
| 2006/0164287 A1 * | 7/2006 | Holt | G01S 13/89 | 342/22 |
| 2007/0262988 A1 * | 11/2007 | Christensen | G06T 15/08 | 345/424 |
| 2008/0069458 A1 * | 3/2008 | Vega-Higuera | G06T 15/08 | 382/232 |
| 2008/0235318 A1 * | 9/2008 | Khosla | G06K 9/6292 | 709/201 |
| 2008/0259079 A1 * | 10/2008 | Boxman | G06T 15/08 | 345/424 |
| 2009/0254302 A1 * | 10/2009 | Jennings | G01S 7/295 | 702/155 |
| 2010/0013920 A1 * | 1/2010 | Nikulin | G01S 7/295 | 348/143 |
| 2011/0170756 A1 * | 7/2011 | Schneider | G06T 15/08 | 382/131 |
| 2012/0093438 A1 * | 4/2012 | Abdillah | G01S 13/887 | 382/286 |
| 2013/0093611 A1 * | 4/2013 | Crowley | G01S 7/4026 | 342/22 |
| 2013/0116561 A1 * | 5/2013 | Rothberg | A61B 8/4254 | 600/438 |
| 2013/0135136 A1 * | 5/2013 | Haynes | G01S 13/89 | 342/22 |
| 2013/0335256 A1 * | 12/2013 | Smith | G01S 13/887 | 342/22 |
| 2014/0066763 A2 * | 3/2014 | Rothberg | A61B 8/4254 | 600/438 |

\* cited by examiner

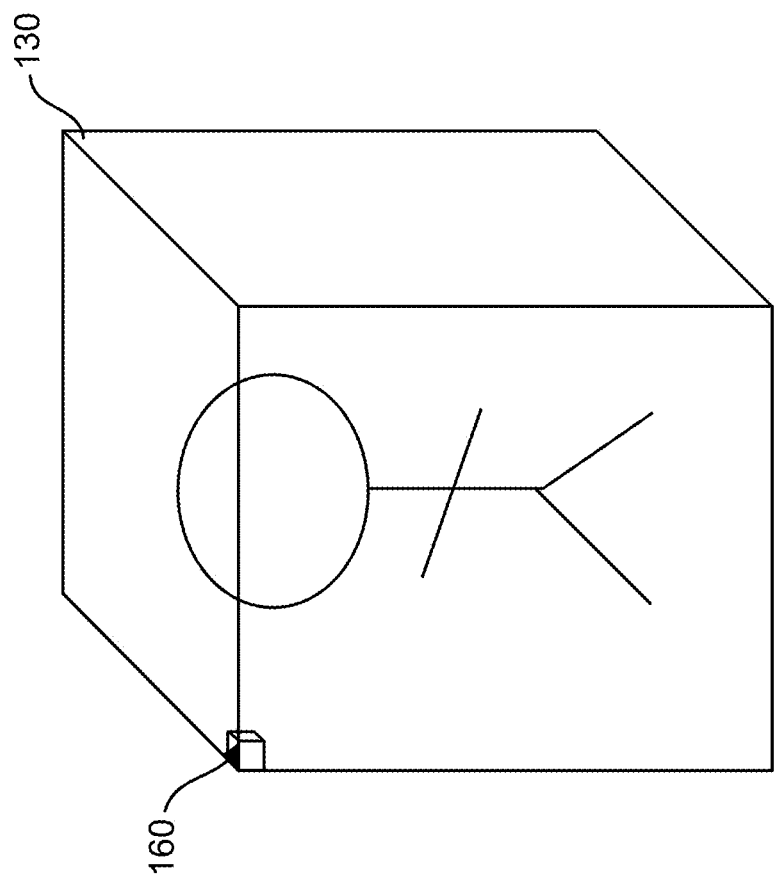
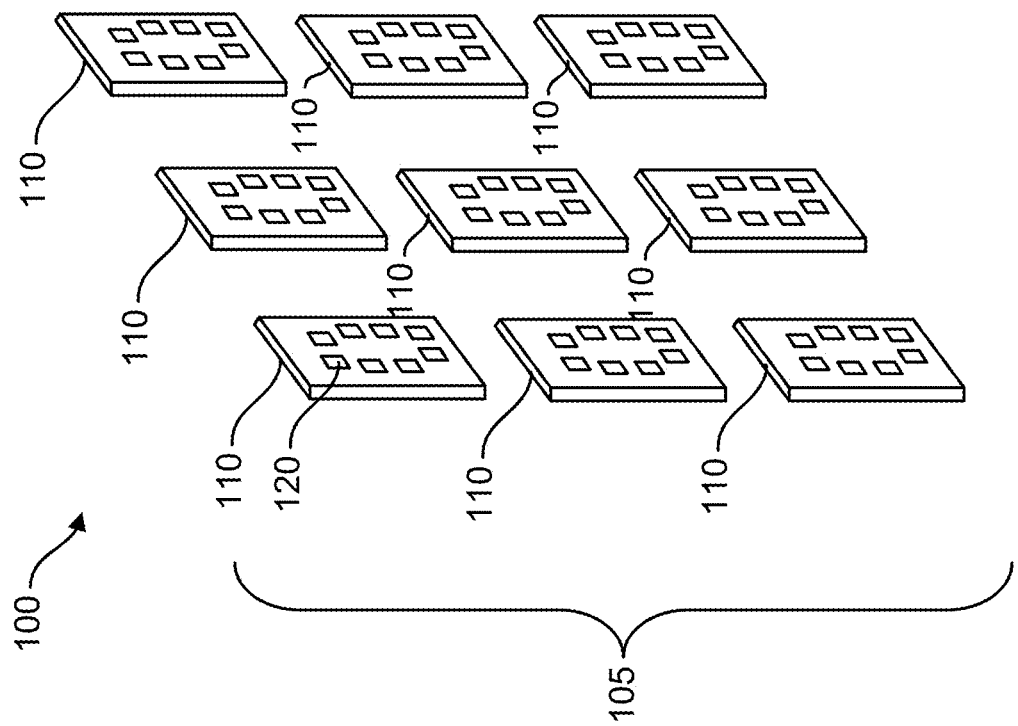
FIG. 1

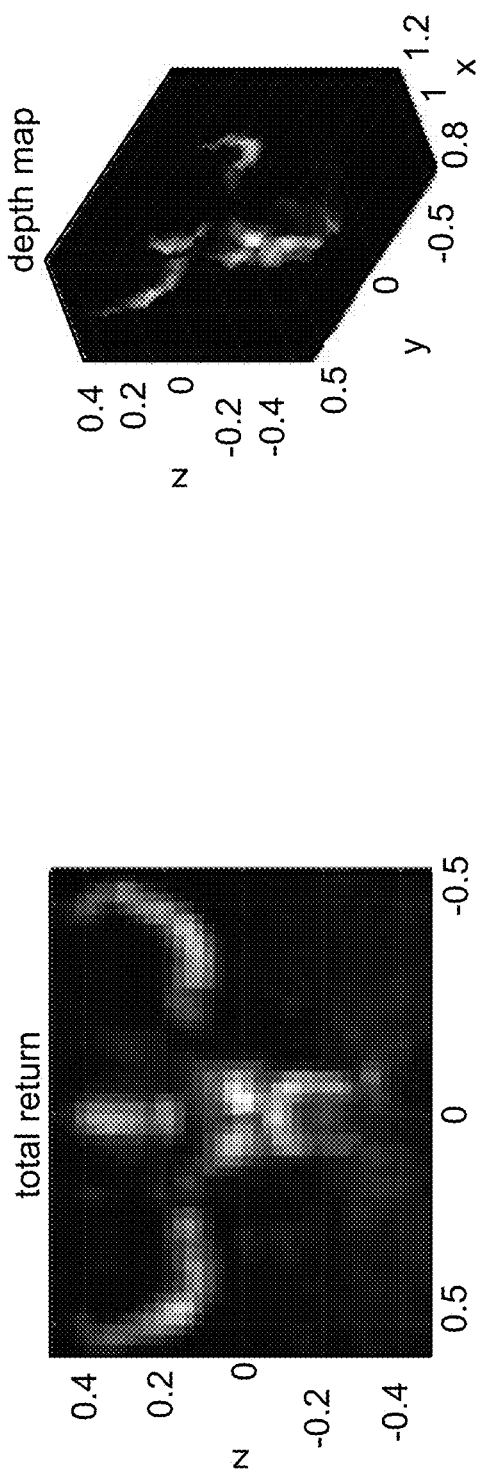
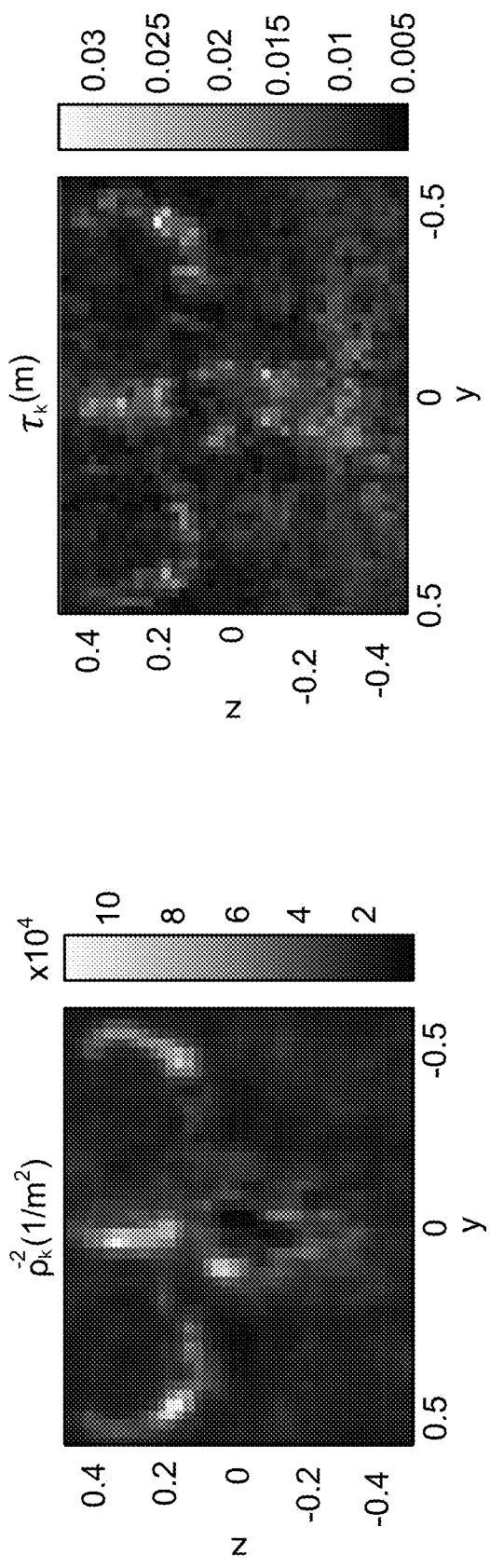
FIG. 13A
FIG. 13B
FIG. 13C
FIG. 13D

PARTITIONING FOR RADAR SYSTEMS

RELATED APPLICATION

This application is a continuation of and claims priority under 35 U.S.C. § 120 to U.S. patent application Ser. No. 14/678,566, filed Apr. 3, 2015, and granted as U.S. Pat. No. 9,823,338, which claims priority under 35 U.S.C. § 119(e) to U.S. Provisional Patent Application No. 61/974,775, filed Apr. 3, 2014, the entire contents of each of which are hereby expressly incorporated by reference herein.

TECHNICAL FIELD

The subject matter described herein relates to a partitioning scheme for solving for inverse wave-scattering solutions.

BACKGROUND

Wave-based imaging in the radiative near-field (e.g., involving an aperture and scene with similar physical extents, and placed in similarly close proximity to one another) can be used in a number of fields and physical contexts, including radar, millimeter wave imaging, and sonography. Such systems can collect an enormous amount of information from the scene, obtaining potentially millions or more measurements, and to solve for scattering coefficients over millions of voxels are not unusual.

SUMMARY

In an aspect, data is received characterizing a plurality of measurements for a scene received by a plurality of sensor elements forming a sensor array. A plurality of scene sub-domains is mapped to the plurality of sensor elements. A plurality of voxels associated with one of the plurality of scene sub-domains is mapped to a plurality of measurement sub-domains. One or more scattering coefficients of the scene is determined by applying the mapping to the received data.

In another aspect, data is received characterizing a measurement for a scene received by a plurality of sensor elements forming a sensor array. Intermediate scattering coefficients can be determined using the received data by applying to the received data a mapping of a plurality of scene sub-domains to the plurality of sensor elements. A parameter of an object within the scene can be estimated using the intermediate scattering coefficients.

One or more of the features disclosed herein including the following features can be included in any feasible combination. For example, each measurement sub-domain can include a grouping of measurements received by some of the plurality of sensor elements. Each measurement sub-domain can include a grouping of measurements having proximal transmitting sensor elements, proximal receiving sensor elements, and frequencies within a predefined frequency range. The sensor array can include a plurality of antenna panels. The transmitting sensor elements can be proximal when the transmitting sensor elements reside on a first common antenna panel. The receiving sensor elements can be proximal when the receiving sensor elements reside on a second common antenna panel.

The plurality of measurements can be grouped into measurement sub-domains based on a first similarity in a location of transmitting sensor elements, a second similarity in a location of receiving sensor elements, and a third similarity in frequency. Each scene sub-domain comprises a volume including a portion of the scene. The plurality of sensor elements can reside on a plurality of panels driven by a frequency modulated continuous wave signal. The plurality of panels can be independently moveable.

Mapping the plurality of scene sub-domains to the plurality of sensor elements can include computing a first block diagonal transfer matrix and mapping the plurality of voxels associated with one of the plurality of scene sub-domains to the plurality of measurement sub-domains can include computing a second block diagonal transfer matrix. Mapping the plurality of voxels associated with one of the plurality of scene sub-domains to the plurality of measurement sub-domains can characterize a local spherical phase correction of the measurement. Voxels associated with one of the plurality of scene sub-domains can be mapped to the plurality of measurement sub-domains for each scene sub-domain. The scene can be partitioned into volumes by associating voxels together to define the plurality of scene sub-domains. Neighboring scene sub-domains can overlap.

A separation between sensor elements associated with one of the plurality of measurement sub-domains and the plurality of scene sub-domains can be greater than a separation between a voxel and an associated scene sub-domain center and can be greater than a separation between one of the plurality of sensor elements associated with one of the plurality of measurement sub-domains and an associated measurement sub-domain center. Applying the mapping to the received data can include computing a match-filter solution using the mapping. Applying the mapping to the received data can include computing, using the mapping, a least squares solution or a compressed sensing solution.

Intermediate scattering coefficients can be determined for each of a plurality of measurement sub-domains. Each measurement sub-domain can include a grouping of measurements received by some of the plurality of sensor elements forming the sensor array. Each scene sub-domain can include a volume including a portion of the scene. The intermediate scattering coefficients can be a product of the measurement and the mapping of the plurality of scene sub-domains to the plurality of sensor elements. The intermediate scattering coefficients form one or more images or point-clouds. The intermediate scattering coefficients can represent reflective properties of the plurality of scene sub-domains with respect to interrogation by sensor elements corresponding to a measurement sub-domain. The measurement sub-domain can include a grouping of measurements having proximal transmitting sensor elements, proximal receiving sensor elements, and frequencies within a predefined frequency range. The sensor array can include a plurality of antenna panels. The transmitting sensor elements can be proximal when the transmitting sensor elements reside on a first common antenna panel. The receiving sensor elements can be proximal when the receiving sensor elements reside on a second common antenna panel.

The object within the scene can be classified based on the parameter. The parameter can characterize a surface of the object within the scene. The parameter can be a statistic of the intermediate scattering coefficients. Estimating the parameter can include using a labeled dataset of intermediate scattering coefficients. The parameter can include a class of the object within the scene. The scattering coefficients may not be computed for individual voxels. The plurality of sensors elements can reside on a plurality of panels driven by a frequency modulated continuous wave signal. The plurality of panels can be independently moveable. The mapping of the plurality of scene sub-domains to the plurality of sensor elements can include a block diagonal transfer matrix. A separation between one of the plurality of measurement sub-domains and the plurality of scene sub-domains can be greater than a separation between a voxel and an associated scene sub-domain center and greater than a separation between one of the plurality of sensor elements and an associated measurement sub-domain center.

Applying the mapping to the received data can include computing a match-filter solution using the mapping. Applying the mapping to the received data can include computing, using the mapping, a least squares solution or a compressed sensing solution.

Computer program products are also described that comprise non-transitory computer readable media storing instructions, which when executed by at least one data processors of one or more computing systems, causes at least one data processor to perform operations herein. Similarly, computer systems are also described that may include one or more data processors and a memory coupled to the one or more data processors. The memory may temporarily or permanently store instructions that cause at least one processor to perform one or more of the operations described herein. In addition, methods can be implemented by one or more data processors either within a single computing system or distributed among two or more computing systems.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 1 is an example implementation of a radiative imaging system;

FIG. 13 is a series of images illustrating feature image extraction from a simulated sparse millimeter wave imaging system.

Like reference symbols in the various drawings indicate like elements.

DETAILED DESCRIPTION

Figure 2:
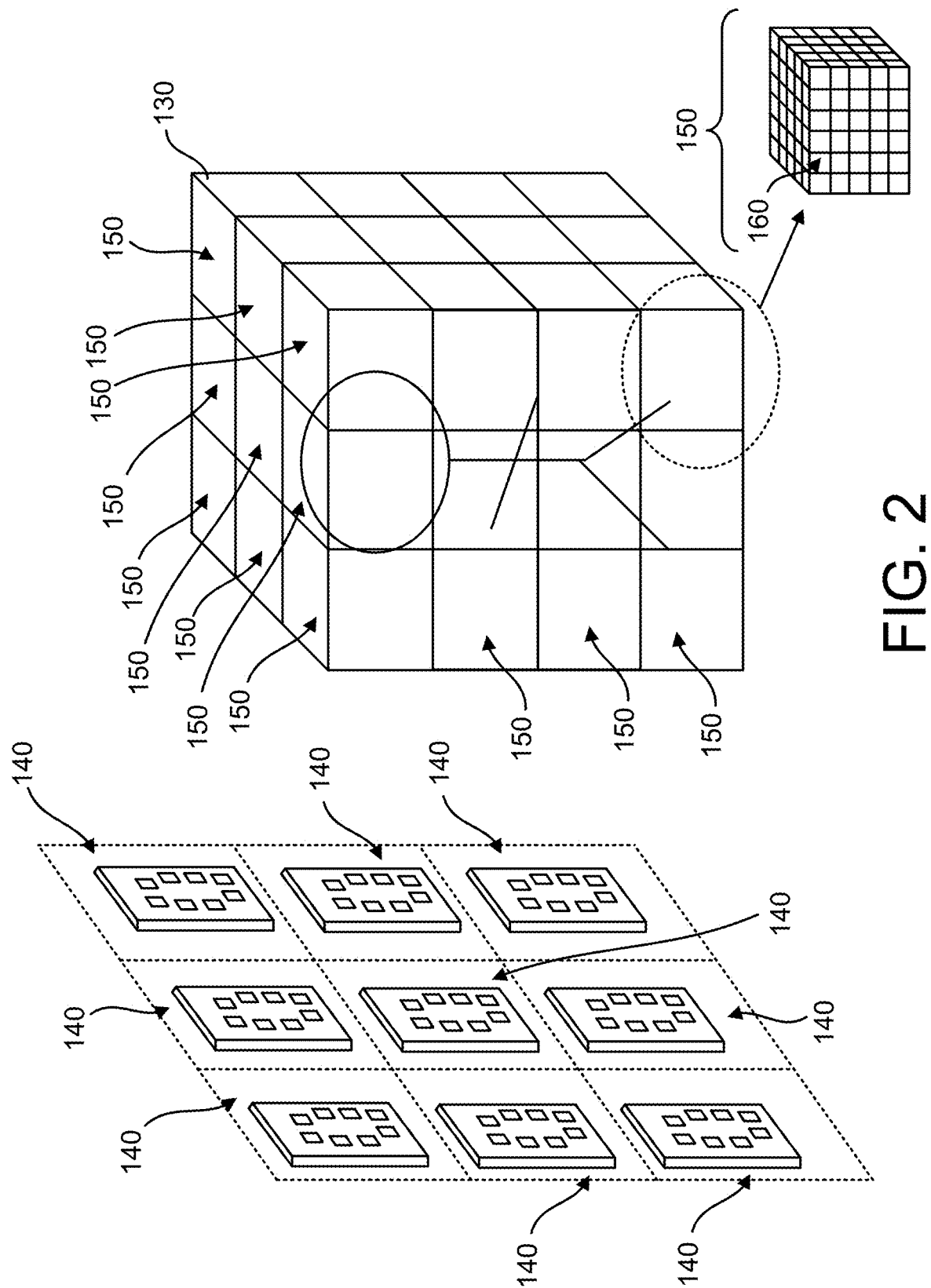
FIG. 2 illustrates the radiative imaging system of FIG. 1 under an example partitioning scheme.

A partitioning scheme can include a series of approximations that can partition a scene into sub-domains (e.g., chunks, segments, sub-volumes, and the like) and can partition measurements received by sensor elements of a sensor array into sub-domains (e.g., chucks, segments, sub-groups, and the like) based on properties of the sensor elements on which the measurements are received. For example, measurements received by sensor elements of a sensor array can be grouped when transmitting sensor elements are proximal to one another, receiving sensor elements are proximal to one another, and/or frequencies are similar (e.g., within a specified bandwidth range). Under the series of approximations, inverting scatter returns received by the sensor array can include mapping many scene sub-domains to multiple sensor elements corresponding to a given measurement sub-domain, and mapping many voxels within a given scene sub-domain to multiple measurement sub-domains. In an example implementation, such mappings can be described using block diagonal matrices, which can be inverted using computationally efficient methods. A voxel can represent a value on a regular grid in three-dimensional space.

Furthermore, in some aspects the current subject matter can provide an intuitive view of the transfer of information between scene and sensor, and can allow for alternative models of the scene. In particular, the formalism can be extended to a piece-wise surface model and it can be shown that such a re-formulation can allow even a minimal system to recover meaningful information. For example, feature extraction can occur at the domain level using a surface model based on an intermediate partitioning solution, which can take the form of a series of images or point-cloud representations of the scene at the resolution level of the scene subdomains, rather than a single image or point-cloud representation of the scene at the highest possible resolution.

FIG. 1 is an example implementation of a radiative imaging system 100. The radiative imaging system 100 can include a sensor array 105 comprising a number of panels HO. Each panel 110 can have one or more sensor elements 120. The radiative imaging system 100 can measure contents of a scene 130 (e.g., wave-based imaging in the radiative near-field) by transmitting a signal and measuring a portion of the transmit signal that back scatters off objects in the scene 130. The scene 130 can be considered to be composed of many voxels 160, which represent values in three dimensional space. (Note that a single voxel 160 is shown in FIG. 1, but it should be understood that the scene 130 volume is filled with voxels 160). The near field is a region of the electromagnetic field around an object, such as a transmitting antenna, or as a result of radiation scattering off an object. Near field behaviors of electromagnetic fields dominate close to the antenna or scattering object, while electromagnetic radiation "far field" behaviors dominate at greater distances.

FIG. 2 illustrates the radiative imaging system 100 of FIG. 1 under an example partitioning scheme. Measurements received by sensor elements 120 of the sensor array 105 can be partitioned into measurement sub-domains 140 based properties of the sensor elements 120 on which the measurements are received. These measurement sub-domains 140 represent groupings or associations of measurements received by sensor elements 120 on the sensor array 105. The measurements received by sensor elements 120 can be grouped according to a characteristic or property of the sensor elements 120 on which measurements are received, such as belonging to a common panel 110 (as illustrated in FIG. 2), although some implementations of the current subject matter is not limited to multiple panel sensor arrays. Measurements received by sensor elements 120 can be grouped into sub-domains, for example, when transmitting sensor elements are proximal to one another, receiving sensor elements are proximal to one another, and/or frequencies are similar. The grouping can be performed by a clustering algorithm (e.g., clustering transmit and/or receive sensor element 120 locations or received signal frequencies), based on a predefined location matrix (e.g., as shown in FIG. 2), and the like. In some implementations, the number of measurement sub-domains 140 and a location of the measurement sub-domain 140 centers are predefined and partitioning measurements received by sensor array 105 into sub-domains can include determining the closest sensor elements 120 to each sub-domain center. In some implementations, measurements received by a sensor element 120 may belong to multiple sub-domains such that measurement sub-domains 140 overlap.

In other words, the measurement sub-domains can include groupings of measurements when the fields responsible for those measurements vary in a "similar" manner within any given scene sub-domain 150. In an example implementation, this can be satisfied when a panel-pair wave vector (described more fully below with reference to Eq. 36) of these measurements is similar over the whole scene (similarity may be measured by a similarity criterion). Measurements generated by distinct combinations of transmitter sensor elements 120, receiver sensor elements 120, and frequency of the received signal can be grouped if transmitters are close (or similar) to each other, receivers are close (or similar) to each other, and frequencies are close (or similar), where closeness and similarity can be measured by a predefined criterion, which can vary based on intended application.

Thus, partitioning the measurements received by sensor array 105 can be considered to impose a hierarchical abstraction onto measurements received by the sensor array 105, such that the measurements received by sensor array 105 contains multiple measurement sub-domains 140, each of which contain measurements by one or more sensor elements 120.

The scene 130 can be considered to contain voxels 160, which represent a value on a regular grid in three-dimensional space (e.g., the scene 130). The scene 130 can be partitioned into scene sub-domains 150. The scene sub-domains 150 represent groupings or associations of voxels 160 such that each scene sub-domain 150 is a volume including a portion of the scene 130. Voxels 160 are illustrated in FIG. 2 at lower right, which shows voxels 160 grouped into a scene sub-domain 150, although it should be understood that the entire scene 130 can be considered to be composed of many voxels 160. Thus, partitioning of the scene 130 can be considered to impose a hierarchical abstraction onto the scene 130, such that scene 130 is a volume containing multiple scene sub-domains 150, each of which contain multiple voxels 160.

In order to process signal returns from the scene 130, a first-Born approximation of modelling scattering from a continuous system can be assumed. For a transmitter at location $\vec{r}'_T$ and a receiver at location $\vec{r}'_R$ with known beam-patterns, the return signal from a complex scene 130 can be expressed as $$g(\omega,\vec{r}'_T,\vec{r}'_R)=\iiint(\vec{E}(\omega,\vec{r}'_T,\vec{r})\cdot\vec{E}(\omega,\vec{r}'_R,\vec{r}))f(\vec{r})d^3\vec{r} \quad (1)$$

where $\vec{E}(\omega,\vec{r}',\vec{r})$ is the electric field radiation pattern of the antenna, and $f(\vec{r})$ represents the spatially varying scattering coefficient of the scene 130. The current subject matter can include a partitioning of both the scene 130 and measurements received by sensor array 105 into smaller domains, such that these domains are small relative to the distance separating the scene 130 and the sensor array 105. It is shown that the transformation represented by Eq. 1 can be approximately factored into the product of two mappings: a mapping from each voxel 160 to measurements received by each measurement sub-domain 140, and a mapping from each scene sub-domain 150 to measurements received by each sensor element 120. When discretized for use in numerical methods, both sets of mappings can be represented as block diagonal transfer matrices, and in some implementations, their application can require orders of magnitude fewer operations than the original problem.

Figure 3:
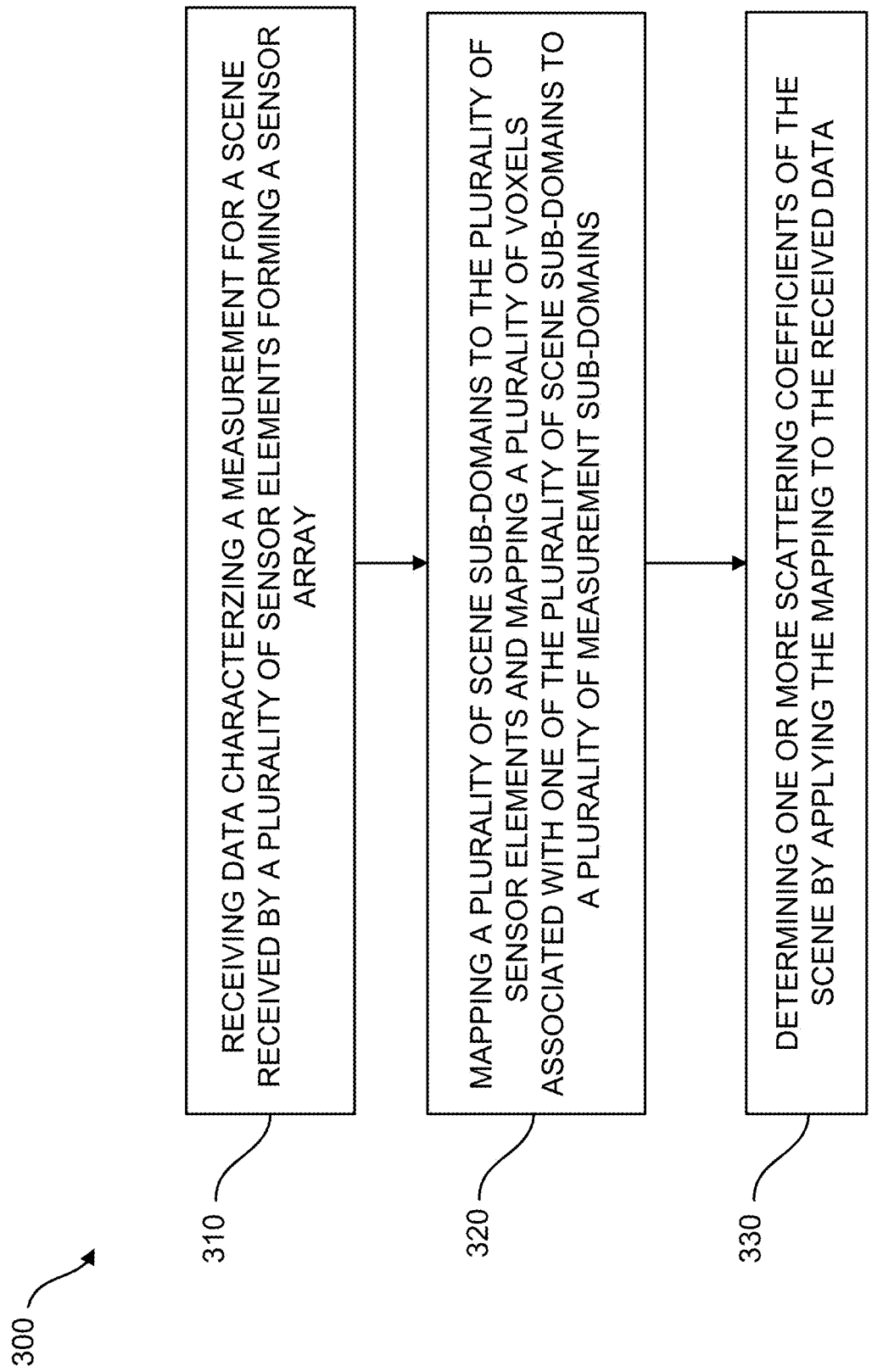
FIG. 3 is a process flow diagram illustrating an example method of determining one or more scattering coefficients of a scene.

FIG. 3 is a process flow diagram illustrating an example process 300 of determining one or more scattering coefficients of a scene 130 (e.g., using the radiative imaging system 100 of FIG. 1). A scattering coefficient of a volume (also referred to as radar cross section and backscattering coefficient) is a measure of how reflective an object within the volume is with a radar. The scattering coefficient of a target is an effective area that intercepts the transmitted radar power and then scatters that power isotropically back to the radar receiver. More formally, it can also be considered to be the hypothetical area required to intercept the transmitted power density at the target such that if the total intercepted power were re-radiated isotropically, the power density actually observed at the receiver is produced.

Data characterizing measurements (e.g., return signals) of a scene 130 can be received at 310. The measurements can be received by a plurality of sensor elements 120 forming a sensor array 105 and can represent radiation transmitted by the radiative imaging system 100 and reflected by objects within the scene. The measurements can be partitioned into measurement sub-domains 140 based on shared or similar properties of the sensor elements 120 on which the measurements are received (for example, as described above with reference to FIG. 2), which can include associating measurements received by sensor elements 120 together based on sensor element 120 location for both transmit and receive sensor elements 120. For example, in some implementations, the sensor elements 120, and thus the measurements they acquire, can be associated together into groups (which may or may not overlap). The measurement sub-domains 140 may correspond to physically distinct regions of sensor elements 120 (e.g., on separate panels) or may correspond to different locations of sensor elements 120 forming part of a regularly spaced array (e.g., on a single phased array antenna). The sensor elements 120 may be regularly or irregularly spaced.

Each measurement sub-domain can include a grouping of measurements having proximal transmitting sensor elements, proximal receiving sensor elements, and frequencies within a predefined frequency range. For example, the transmitting sensor elements and receiving sensor elements can be considered proximal according to a clustering algorithm, a predefined location matrix, when they are within a predefined distance to sub-domain center points, and other similarity metrics. In an example implementation, the sensor array can include a plurality of antenna panels and the transmitting sensor elements can be proximal when the transmitting sensor elements reside on a common antenna panel. The receiving sensor elements can be proximal when the receiving sensor elements reside on another common antenna panel.

In some implementations, the plurality of measurements can be grouped into measurement sub-domains based on a similarity in a location of transmitting sensor elements, a similarity in a location of receiving sensor elements, and a similarity in frequency. Whether sensor elements have a similar location and whether the frequencies of measurements are similar can be based on predefined criterion.

Measurements may also be associated into groups if they represent different mechanical and/or electrical configurations of the same antenna or antenna array (e.g., as in mechanical scanning or phased array reconfiguration). Mappings can be dynamically computed and/or applied as the sensor array is reconfigured (e.g., a new mapping can be applied for each data frame). Measurements may also be associated into groups based on their frequency properties.

In addition, scene 130 can be partitioned into scene sub-domains 150, which can include associating voxels 160 within scene 130 together. For example, in some implementations, voxels 160 can be associated together into groups or scene sub-domains 150 (neighboring groups may or may not overlap). Scene sub-domains 150 can be cubic in shape, although other shapes are possible. Each scene sub-domain 150 can include a volume that is a portion of the scene 130.

At 320 scene sub-domains 150 can be mapped to sensor elements 120. In addition, a plurality of voxels 160 associated with one of the scene sub-domains 150 can be mapped to the measurement sub-domains 140. In some implementations many scene sub-domains 150 can be mapped to multiple sensor elements 120 corresponding to a given measurement sub-domain 140, and many voxels 160 within a given scene sub-domain 150 can be mapped to multiple measurement sub-domains 140.

In an example implementation, these mappings can be described using block diagonal matrices, which can be inverted using computationally efficient methods. For example, mapping the scene sub-domains 150 to the sensor elements 120 can include computing a first block diagonal transfer matrix (e.g., matrix A as described more fully below). Mapping the voxels 160 associated with one (or each) of the scene sub-domains 150 to the measurement sub-domains 140 can include computing a second block diagonal transfer matrix (e.g., matrix B as described more fully below).

At 330, scattering coefficients of the scene 130 can be determined by applying the mapping to the measurement (e.g., return signal). Because in some example implementations, the mappings can be described using block diagonal matrices, the inversion can be performed using computationally efficient methods. For example, the mapping can be applied directly to the return signal, such as in a matched filter type solution, or the mapping can be applied as part of a more complicated algorithm for solving an inverse problem, like least squares, or compressive sensing. Other inversion algorithms are possible. The scattering coefficients can then be used, for example, for creating an image of objects within the scene and automatic detection of threat objects, such as knives, guns, explosives, and the like, within the scene.

In some aspects, the current subject matter can provide an intuitive view of the transfer of information between scene 130 and sensor array 105, and can allow for alternative models of the scene 130. In particular, the formalism can be extended to a piece-wise surface model and feature extraction can occur at the domain level using a surface model based on an intermediate partitioning solution, which can represent images from the perspective of a measurement sub-domain 140 rather than the full sensor array 105.

Figure 4:
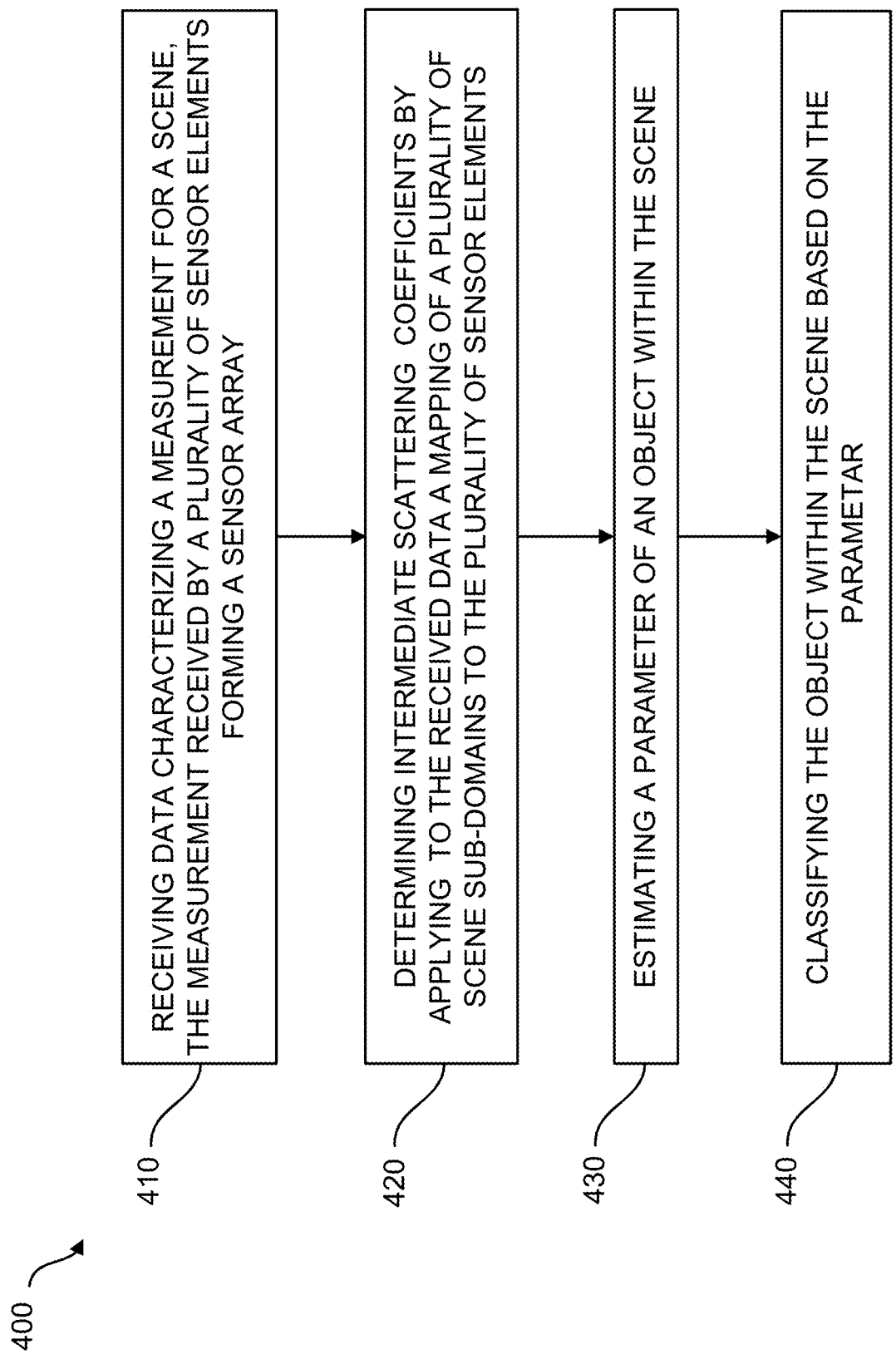
FIG. 4 is a process flow diagram of a method for estimating a parameter of an object within the scene using an intermediate solution.

FIG. 4 is a process flow diagram of a process 400 for estimating a parameter of an object within the scene using an intermediate solution.

Data characterizing measurements (e.g., return signals) of a scene can be received at 410. The measurements can be received by a plurality of sensor elements 120 forming a sensor array 105. The sensor array 105 can be partitioned into measurement sub-domains 140, which can include associating sensor elements 120 together. In addition, the scene 130 can be partitioned into scene sub-domains 150, which can include associating voxels 160 within the scene 130 together.

At 420, intermediate scattering coefficients can be determined by applying to the received data a mapping of scene sub-domains 150 to sensor elements 120. In some implementations, the intermediate scattering coefficients can be a product of the measurements and the mapping of the scene sub-domains 150 to the sensor elements 120 (e.g., the mapping can be applied directly, as in a matched-filter solution). In some implementations, the mapping can be applied as part of a more complicated algorithm for solving an inverse problem, like least squares, or compressive sensing. The intermediate scattering coefficients are not the scattering coefficients (e.g., as described in reference to FIG. 3) in that they do not represent the reflective properties of each voxel 160. Instead, the intermediate scattering coefficients represent the reflective properties of scene sub-domains 150 with respect to interrogation by the collection of sensor elements 120 corresponding to a particular measurement sub-domain 140. The intermediate scattering coefficients can form one or more "coarse" images of the scene 130. The intermediate scattering coefficients can represent a low-resolution equivalent of a full image (created from fully inverted scattering coefficients) of the scene 130 and from the perspective of any sensor element 120 within a measurement sub-domain 140. In some implementations, the individual voxel scattering coefficients do not need to be computed.

In an example implementation, the mapping can be described using a block diagonal matrix, which can be inverted using computationally efficient methods. For example, the mapping of the scene sub-domains 150 to the sensor elements 120 can be characterized by a block diagonal transfer matrix (e.g., matrix A as described more fully below).

At 430, a parameter of an object within the scene 130 can be estimated using the intermediate scattering coefficients. The parameter can characterize, for example, a surface of an object within the scene 130. The characterizations can include, for example, a surface normal, surface specularity, surface offset from center of sub-domain, object opacity, object scattering coefficient, and cross-polarizability. In some implementations, the parameter estimation can include computing a statistic (e.g., mean, median, standard deviation, and the like) of the intermediate scattering coefficients. In some implementations, the parameter can be learned from labeled datasets of intermediate scattering coefficients from various objects of interest. For example, given a data set of intermediate scattering coefficients from a set of objects, labeled according to the object itself or some hierarchical classification of the objects, a human or algorithm can then construct a set of parameters, each described by a linear and/or nonlinear combination of intermediate scattering coefficients, for the purposes of classifying new sets of intermediate scattering coefficients as belonging to one of the known classifications.

At 440, the object within the scene can be classified based on the parameter. The object can be classified, for example, based on whether or not it is a threat object. The classification can provide for automatic detection of threat objects, such as knives, guns, explosives, and the like, within the scene.

With respect to the methods of FIG. 3 and FIG. 4, in some implementations, the plurality of sensor elements 120 can reside on multiple panels 110 driven by a frequency modulated continuous wave signal. The panels 110 can be independently movable and each measurement sub-domain 140 can include one of the panels 110.

In some implementations, the partitioning scheme can be determined. For example, the process 300 and/or process 400 can further include partitioning the sensor array 105 by associating sensor elements 120 together to define the measurement sub-domains 140. The process 300 and/or process 400 can further include partitioning the scene 130 into volumes by associating voxels 160 together to define the scene sub-domains 150. Determining the partitioning scheme can be performed dynamically, for example, the partitioning scheme can vary for each frame of data measured by the sensor array 105.

In some implementations, the scene 130 and sensor array 105 are separated by a distance that is such that far-field approximations are inaccurate, though still large enough that reactive near-field effects can be neglected, in which case the scene 130 and sensor array 105 are separated by an "in-between" distance. A series of "in-between field" approximations can be made that are valid (e.g., low error) for this "in-between" range. The "in-between" range can be valid when the separation between a measurement sub-domain 140 and the scene sub-domains 150 is (1) greater than a separation between a voxel 160 and an associated scene sub-domain 150 center, (2) greater than a separation between the sensor elements 120 and an associated measurement sub-domain 140 center, and (3) much greater than the typical wavelength employed by the sensors. In other words, the distance between a measurement sub-domain 140 and a scene sub-domain 150 is greater than the intra-sensor-array-sub-domain and intra-scene-sub-domain length scales.

An example "in-between field" approximation can include applying a local spherical phase correction. The mapping of the voxels 160 associated with one (or each) of the scene sub-domains 150 to the measurement sub-domains 140 can characterize the local spherical phase correction of the return signal and can be valid for a range of sensor element 120 locations, a set of sensor configurations or modes, and a range of frequencies of the sensor array 105, which otherwise constitute distinct measurements.

An example formulation follows.

With respect to the scene, without loss of generality, the complex scene, $f(\vec{r})$, can be expressed as an arbitrary summation of K blocks, or sub-domains, such that $$f(\vec{r}) = \sum_{k=1}^{K} f(\vec{r}) \Delta_k(\vec{r} - \vec{r}_k) = \sum_{k=1}^{K} f_k(\vec{r} - \vec{r}_k), \qquad (2)$$

where $\Delta_k(\vec{r} - \vec{r}_k)$ is a unit-less geometrical function denoting sub-domain k, whose center-point is given by $\vec{r}_k$, and which can be circumscribed by some sphere with radius $R_k$, encompassing a volume $V_k$, beyond which the function is everywhere zero. For normalization purposes, $\Sigma_{k=1}^{K} \Delta_k(\vec{r} - \vec{r}_k) = 1$ for all $\vec{r}$ over which the scene is defined. As an example, the scene can be partitioned into K cubes with side lengths a, giving $$\Delta(\vec{r} - \vec{r}_k) = rect\left(\frac{(\vec{r} - \vec{r}_k) \cdot \hat{x}}{a}\right) rect\left(\frac{(\vec{r} - \vec{r}_k) \cdot \hat{y}}{a}\right) rect\left(\frac{(\vec{r} - \vec{r}_k) \cdot \hat{z}}{a}\right). \qquad (3)$$

There is a continuum of different partitions or sub-domain geometries that can be chosen that satisfy Eq. 2, including schemes in which neighboring domains have overlap, but in what follows the cube example is used for illustrative purposes.

Returning to Eq. 1, the above substitution can be made, and also introduce $\vec{r}_l = \vec{r} - \vec{r}_k$ to denote position relative to a sub-domain center, yielding $$g(\omega, \vec{r}_T', \vec{r}_R') = \qquad (4)$$
$$\sum_k \int\int\int_{V_k} (\vec{E}(\omega, \vec{r}_T', \vec{r}_k + \vec{r}_l) \cdot \vec{E}(\omega, \vec{r}_R', \vec{r}_k + \vec{r}_l)) f_k(\vec{r}_l) d^3\vec{r}_l.$$

For the sake of convenience, in what follows, the index l will always appear in the context of a subdomain k, such that, taken together, the labels are unambiguous.

With respect to the antennas, when considering separations between scene and antenna that are much larger than the physical dimensions of a given antenna, the fields can be expressed in the form $$\vec{E}(\omega, \vec{r}', \vec{r}) = \vec{C}(\theta, \phi, \omega) \frac{e^{i\frac{\omega}{c}|\vec{r} - \vec{r}'|}}{|\vec{r} - \vec{r}'|} \qquad (5)$$

where $\vec{C}(\theta, \phi, \omega)$ is a complex vector amplitude that represents the antenna's beam pattern as a function of frequency, as well as elevation ($\theta$) and azimuth ($\phi$) angle relative to the orientation of the antenna.

Analogous to the partitioning of the scene, the distinct transmitters and receivers can be grouped into panels (e.g., as illustrated in FIG. 1), indexed such that panel i has center-point with its associated modes indexed by m. Here the generic term mode can be used to encompass both of the following situations: individual antennas, proximally located but independently operating; and distinct states of a single scanned antenna array. For the sake of convenience, in what follows, the index in will appear in the context of a panel i, such that, taken together, the labels are unambiguous. It will also be useful to define the sphere with radius $R_i$, centered at the panel center-point as the smallest such sphere circumscribing all radiating sources associated with this panel.

The bandwidth of the system can be similarly partitioned into S bins with bandwidth $\Omega_s$, such that $\omega=\omega_s+\omega_t$, where $\omega_s$ is the center frequency of bin s, and $-\Omega_s/2<\omega_t<\Omega_s/2$. In this way, $\vec{E}(\omega, \vec{r}'_T, \vec{r}) \to \vec{E}(\omega_s+\omega_t, \vec{r}'_j+\vec{r}'_m, \vec{r})$ and $\vec{E}(\omega, \vec{r}'_R, \vec{r}) \to \vec{E}(\omega_s+\omega_t, \vec{r}'_j+\vec{r}'_n, \vec{r})$.

Putting it all together, the sensing expression can be expressed as:

$$g(\omega_s + \omega_t, \vec{r}'_i + \vec{r}'_m, \vec{r}'_j + \vec{r}'_n) = \qquad (6)$$

$$\sum_k \int\int\int_{V_k} H(\omega_s + \omega_t, \vec{r}'_i + \vec{r}'_m, \vec{r}'_j + \vec{r}'_n, \vec{r}_k + \vec{r}_l) f_k(\vec{r}_l) d^3\vec{r}_l.$$

where the sensing kernel is introduced $$H(\omega_s + \omega_t, \vec{r}'_i + \vec{r}'_m, \vec{r}'_j + \vec{r}'_n, \vec{r}_k + \vec{r}_l) = \qquad (7)$$

$$\vec{E}(\omega_s + \omega_t, \vec{r}'_i + \vec{r}'_m, \vec{r}_k + \vec{r}_l) \cdot \vec{E}(\omega_s + \omega_t, \vec{r}'_j + \vec{r}'_n, \vec{r}_k + \vec{r}_l) =$$

$$\vec{C}(\theta_{kl,im}, \phi_{kl,im}, \omega_s + \omega_t) \cdot \vec{C}(\theta_{kl,jn}, \phi_{kl,jn}, \omega_s + \omega_t)$$

$$\frac{e^{i\frac{\omega_s+\omega_t}{c}(|\vec{r}_k+\vec{r}_l-\vec{r}'_i-\vec{r}'_m|+|\vec{r}_k+\vec{r}_l-\vec{r}'_j-\vec{r}'_n|)}}{|\vec{r}_k + \vec{r}_l - \vec{r}'_i - \vec{r}'_m||\vec{r}_k + \vec{r}_l - \vec{r}'_j - \vec{r}'_n|}.$$

With respect to approximation and error, as it is expressed, a discretized version of Eq. 6 of the form g=Hf, employs a full sensing kernel with an independent value for every combination of transmit panel and mode, receive panel and mode, frequency, and scene voxel. Such a matrix will quickly become unwieldy for large scenes, and very difficult or even impossible to invert by traditional numerical methods. It can be preferable to exploit any redundancy in the matrix and express it as the product of smaller, sparser, potentially more invertible matrices. Towards this goal, introducing a number of approximations and restrictions related to the partitioning of both antennas and scene may be used.

From inspection of the sensing kernel in Eq. 7, the fastest varying term with respect to any and all of the variables is the complex exponent. An approximation to this term may have negligible effect, by comparison, on the amplitude terms, and thus the exponent's argument can be focused on, $$\frac{\omega_s + \omega_t}{c}|\vec{r}_k + \vec{r}_l - \vec{r}'_i - \vec{r}'_m|.$$

While far-field approximations may be prohibitively restrictive, it can be assumed that for a fairly general class of antennas and scenes, there will exist a natural partitioning scheme for which the distance between a panel and a sub-domain, $|\vec{r}_k - \vec{r}'_i|$, will tend to be larger than the intra-panel ($|\vec{r}'_m|$) and intra-sub-domain ($|\vec{r}_l|$) length scales. Such a realization motivates the following decomposition of the overall distance, $$\frac{\omega_s + \omega_t}{c}|\vec{r}_k + \vec{r}_l - \vec{r}'_i - \vec{r}'_m| = \qquad (8)$$

$$\frac{\omega_s + \omega_t}{c}|\vec{r}_k - \vec{r}'_i - \vec{r}'_m| + \frac{\omega_s}{c}(|\vec{r}_k + \vec{r}_l - \vec{r}'_i| - |\vec{r}_k - \vec{r}'_i|) + \eta,$$

where the first two terms on the RHS are the proposed approximation, and $\eta$ is the associated error. The error can be probed by expanding $\eta$ for small $\vec{r}_m$, $\vec{r}_l$, and $\omega_t$, which gives $$\eta = \frac{\omega_t}{c}\left(\frac{\vec{r}_k - \vec{r}'_i}{|\vec{r}_k - \vec{r}'_i|} \cdot \vec{r}_l\right) + \qquad (9)$$

$$\frac{\omega_s}{c}\left(\frac{\vec{r}_l \cdot \vec{r}_m}{|\vec{r}_k - \vec{r}'_i|} + \frac{(\vec{r}_l \cdot (\vec{r}_k - \vec{r}'_i))(\vec{r}_m \cdot (\vec{r}_k - \vec{r}'_i))}{|\vec{r}_k - \vec{r}'_i|^3}\right) + \text{higher order terms}.$$

Expressed this way, it can be seen that the dominant error terms are second-order in the "local" parameters $\omega_t$, $\vec{r}_m$, and $\vec{r}_l$. Thus, this approximation does not require satisfaction of the stricter far-field conditions, $|\vec{r}_l|$, $|\vec{r}_m| \ll |\vec{r}_k - \vec{r}'_i|$, but only that the second-order products in Eq. 9 are small, which in turn may allow the use of larger sub-domains. This is shown graphically in FIG. 5, which is an illustration showing a panel 110 left and the relationship between the spherical wave approximation, the plane wave approximation, and the various length scales.

A maximum error can be derived by considering the radii $R_k$ and $R_i$ and bandwidth $\Omega_s$ that encompass the scene sub-domains, antenna panels, and frequency bins, respectively. Using these values and assuming the maximum values of the dot products in the error expressions, the maximum error (to lowest order) is $$\eta_{max} = \frac{1}{2}\frac{\Omega_s}{c}R_k + \frac{\omega_s}{c}\left(\frac{2R_k R_i}{|\vec{r}_k - \vec{r}'_i|}\right). \qquad (10)$$

The results is that the proposed approximation, $$\frac{\omega_s + \omega_t}{c}(|\vec{r}_k + \vec{r}_l - \vec{r}'_i - \vec{r}'_m|) \approx \qquad (11)$$

$$\frac{\omega_s + \omega_t}{c}|\vec{r}_k + \vec{r}_l - \vec{r}'_i - \vec{r}'_m| + \frac{\omega_s}{c}(|\vec{r}_k + \vec{r}_l - \vec{r}'_i| |\vec{r}_k - \vec{r}'_i|),$$

can be considered valid under the condition that $\eta_{max} \ll 2\pi$. As an example, for a ~1 m distance between sensors and scene, and a central frequency of 30 GHz, an $$\eta_{max} < \frac{2\pi}{10}$$

can be achieved for $R_{i,j}=R_k=1.6$ cm, and $\Omega_s=2\pi \times 1.7$ GHz. However, since this is the maximum error, it is likely that even looser restrictions on the partitioning can still provide useful results within some desired error tolerance.

With respect to factorization, using Eq. 11 approximation in Eq. 6 results in $$g(\omega_s + \omega_t, \vec{r}'_i + \vec{r}'_m, \vec{r}'_j + \vec{r}'_n) \approx \sum_k A_k(\omega_s + \omega_t, \vec{r}'_i + \vec{r}'_m, \vec{r}'_j + \vec{r}'_n) \quad (12)$$

$$\iiint_{V_k} B_k(\omega_s, \vec{r}'_i, \vec{r}'_j, \vec{r}_l) f_k(\vec{r}_l) d^3\vec{r}_l$$

where $$A_k(\omega_s + \omega_t, \vec{r}'_i + \vec{r}'_m, \vec{r}'_j + \vec{r}'_n) = \quad (13)$$

$$\vec{E}(\omega_s + \omega_t, \vec{r}'_i + \vec{r}'_m, \vec{r}_k) \cdot \vec{E}(\omega_s + \omega_t, \vec{r}'_j + \vec{r}'_n, \vec{r}_k)$$

and $$B_k(\omega_s, \vec{r}'_i, \vec{r}'_j, \vec{r}_l) = e^{i\frac{\omega_s}{c}(|\vec{r}_k + \vec{r}_l - \vec{r}'_i| - |\vec{r}_k - \vec{r}'_i| + |\vec{r}_k + \vec{r}_l - \vec{r}'_j| - |\vec{r}_k - \vec{r}'_j|)}. \quad (14)$$

Thus, the sensing kernel is factored into the sets of $A_k$ and $B_k$, each depending on fewer variables than the kernel as a whole, such that the $A_k$ factors can actually be pulled out of the local integrals.

With respect to physical interpretations of the transformations, the physical interpretation of these two transformations can be considered quite natural; $A_k$ can be considered the original transformation, calculated to the centers of each scene sub-domain, and thus independent of the detail within a sub-domain, or $$A_k(\omega_s+\omega_t, \vec{r}'_i+\vec{r}'_m, \vec{r}'_j+\vec{r}'_n) = H(\omega_s+\omega_t, \vec{r}'_i+\vec{r}'_m, \vec{r}'_j+ \vec{r}'_n, \vec{r}_k+\vec{r}_l)|_{\vec{r}_l=0} \quad (15)$$

$B_k$ on the other hand, takes the form of a local spherical phase correction, and is independent of the spatial mode and precise frequency of the transmit and receive panels. This spherical correction is similar, though not equivalent, to piece-wise application of a spatial Fourier transform, which would be expected from a standard far-field approximation. The relationship can be elucidated by considering B in the stricter limit, $$\lim_{\substack{\vec{r}_l \\ |\vec{r}_k - \vec{r}'_i|}} B_k(\omega_s, \vec{r}'_i, \vec{r}'_j, \vec{r}_l) = e^{i\frac{\omega_s}{c}\left(\frac{\vec{r}_k-\vec{r}'_i}{|\vec{r}_k-\vec{r}'_i|} + \frac{\vec{r}_k-\vec{r}'_j}{|\vec{r}_k-\vec{r}'_j|}\right)\vec{r}_l} \quad (16)$$

which is simply a plane-wave with wavevector $$\vec{v}^k_{ijs} = \frac{\omega_s}{c}\left(\frac{\vec{r}_k - \vec{r}'_i}{|\vec{r}_k - \vec{r}'_i|} + \frac{\vec{r}_k - \vec{r}'_j}{|\vec{r}_k - \vec{r}'_j|}\right). \quad (17)$$

Figure 5:
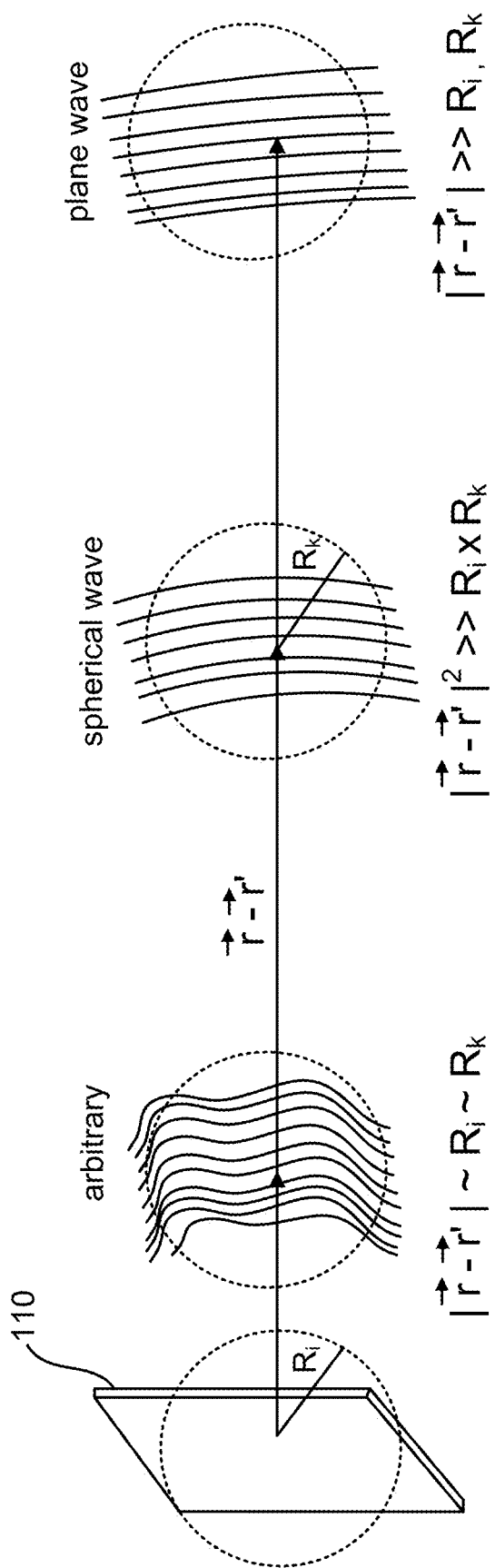
FIG. 5, which is an illustration showing a panel left and the relationship between the spherical wave approximation, the plane wave approximation, and the various length scales.

The relationship between these wave approximations is depicted graphically in FIG. 5.

Additionally/also, the physical interpretation of the intermediate solution can be considered. The intermediate solution can be expressed as $$F_k(\omega_s, \vec{r}'_i, \vec{r}'_j) = \iiint_{V_k} B_k(\omega_s, \vec{r}'_i, \vec{r}'_j, \vec{r}_l) f_k(\vec{r}_l) d^3\vec{r}_l. \quad (18)$$

It follows that $F_k(\omega_s, \vec{r}'_i, \vec{r}'_j)$ is similar to evaluation of the spatial Fourier transform of the $k^{th}$ scene subdomain. More interestingly, however, it is fair to think of the set of all $F_k(\omega_s, \vec{r}'_i, \vec{r}'_j)$ for a fixed choice of $\omega_s, \vec{r}'_i$, and $\vec{r}'_j$, as a sort of low-resolution "image" of the scene, since there is a value for every subdomain. Since it has been seen from the error analysis that variation in $\omega_t, \vec{r}_m$, and $\vec{r}_n$ has negligible effect on the fields within these subdomains, $F_k(\omega_s, \vec{r}'_i, \vec{r}'_j)$ represents the low-resolution equivalent of the full image from the perspective of any sensor operating within $\vec{R}_{i,j}$ and $\Omega_s$ of the transmitter/receiver locations and frequency. By introducing additional $\omega_s, \vec{r}'_i$, and $\vec{r}'_j$ additional low-resolution "images" of the scene can be obtained from new viewpoints, which, when properly aggregated, can allow the system to discern the fine detail within subdomains. In short, finely spaced sensors on a single a panel (as well as fine frequency steps) allow a system to discern coarse features amongst many subdomains, while multiple panels and a wide bandwidth allow a system to discern features on a much finer scale. Thus, shown is the very satisfying result that the qualitative behavior of synthetic aperture radar (SAR) imaging, that is, the dependence of resolution on aperture and bandwidth, and aliasing on pitch and frequency resolution, are reproduced within the framework of multi-offset and sparse millimeter-wave imaging.

With respect to discretization, due to the nature of digital data collection and numerical data processing, all of the continuous variables within the system must be discretized. Measurements may be made by continuous-wave (CW) excitation, switching one at a time through all panels, modes, and frequencies, such that Eq. 6 becomes $$g_{ijsmnt} = \sum_k \sum_l H_{ijsmnt,kl} f_{kl} \quad (19)$$

where the following substitutions have been made $g_{ijsmnt}=g(\omega_s+\omega_t, \vec{r}'_i+\vec{r}'_m, \vec{r}'_j+\vec{r}'_n)$, $H_{ijsmnt,kl}=H(\omega_s+\omega_t, \vec{r}'_i+\vec{r}'_m, \vec{r}'_j+\vec{r}'_n, \vec{r}_k+\vec{r}_l)$, and $f_{kl}=f_k(\vec{r}_l)$. Thus, the fully discretized system may be composed of I transmit panels with M modes each, J receive panels with N modes each, K scene sub-domains with L voxels each, and S frequency bins with T frequency points per bin. This can be reformulated as follows:

$$g=Hf, \quad (20)$$

where g and f are column vectors ordered according to their subscripts, and H is the matrix representation of the sensing operation. This form, representing the so-called brute force method, requires IMJNSTKL multiplications to calculate g.

In this discrete form, the factorization of the previous section can be characterized as $$g_{ijsmnt} = \sum_k A^{(ijs)}_{mnt,k}\left[\sum_l B^{(k)}_{ijs,l} f_{kl}\right]. \quad (21)$$

Again, in this indexing of the measurement, i indexes the transmit panel, j indexes the receive panel, m indexes the mode of the transmit panel, n indexes the mode of the receive panel, s indexes the frequency bin (coarse frequency control), and t indexes the frequencies within the $s^{th}$ bin (fine frequency control). Regarding the indexing of the scene, k indexes the subdomain (coarse representation of the scene), while l indexes the voxel within this subdomain. In this factorized format, it can be seen that the total number of multiplications has dropped to IJSKL+IMJNSTK, a factor of $$\frac{MNTL}{MNT+L}$$

fewer than the brute force method. For a matched system, IJS=MNT=K=L, and the computational asymptotic for a system with $N_{vox}$ voxels would be simply $O(N_{vox}^{3/2})$ instead of $O(N_{vox}^2)$.

In matrix form, the reduction in computation from factoring is expressed in the representation of the A and B transfer functions as sparse matrices in $$g = APBf, \quad (22)$$

where P is a permutation matrix such that there is some freedom in choosing the structure of A and B. At this point, it is convenient to re-introduce the intermediate solution of Eq. 18.

$$g = APF, \text{ and } F = Bf \quad (23)$$

Indexing F according to $F_{kijs}$, such that B is a mapping between the indices kl and kijs, the desired result can be achieved that B is a block diagonal matrix, $$B = \begin{pmatrix} B^{(1)} & & & 0 \\ & B^{(2)} & & \\ & & \ddots & \\ 0 & & & B^{(K)} \end{pmatrix} \quad (24)$$

Thus, B is composed of K sub-matrices, $B^{(k)}$, each size IJS×L, whose individual elements are given by $$B_{ijs,l}^{(k)} = e^{i\frac{\omega_s}{c}(|\vec{r}_k + \vec{r}_l - \vec{r}_i'| - |\vec{r}_k - \vec{r}_i'| + |\vec{r}_k + \vec{r}_l - \vec{r}_j'| - |\vec{r}_k - \vec{r}_j'|)}. \quad (25)$$

Note that superscripts indicate a variable that is kept constant over the sub-matrix.

To induce a similar block diagonal form in A, the intermediate solution is re-ordered by the permutation matrix P, which takes $F_{kijs}$ and puts it in the form $F_{ijsk}$. Thus, A is a mapping between indices ijsk and ijsmnt, and so it too has a block diagonal form $$A = \begin{pmatrix} A^{(111)} & & & 0 \\ & A^{(112)} & & \\ & & \ddots & \\ 0 & & & A^{(IJS)} \end{pmatrix} \quad (26)$$

such that A is composed of IJS sub-matrices, $A^{(ijs)}$, each size MNT×K, whose individual elements are given by $$A_{mnt,k}^{(ijs)} = \vec{E}(\omega_s + \omega_t, \vec{r}_i' + \vec{r}_m', \vec{r}_k) \cdot \vec{E}(\omega_s + \omega_t, \vec{r}_j' + \vec{r}_n', \vec{r}_k) = \quad (27)$$

$$\vec{C}(\theta_{kim}, \phi_{kim}, \omega_s + \omega_t) \cdot \vec{C}(\theta_{kjn}, \phi_{kjn}, \omega_s + \omega_t)$$

-continued $$\frac{e^{i\frac{\omega_s + \omega_t}{c}(|\vec{r}_k - \vec{r}_i' - \vec{r}_m'| + |\vec{r}_k - \vec{r}_j' - \vec{r}_n'|)}}{|\vec{r}_k - \vec{r}_i' - \vec{r}_m'||\vec{r}_k - \vec{r}_j' - \vec{r}_n'|}.$$

In this form, it follows that the beam patterns can be implemented efficiently through look-up tables, whereby a given relative position vector, $\vec{r}_k - \vec{r}_i' - \vec{r}_m'$ for example, is decomposed into azimuth and elevation in the coordinate system of the particular antenna, and used as indices into a master beam pattern table, $\vec{C}_{\theta,\phi,\omega}$, that has been previously computed and stored for quick access. Here it is implicitly assumed that all panels and modes have the same beam pattern, but this could be further generalized.

Finally, it follows that similarly the adjoint operation, $$\tilde{f} = H^H g, \quad (28)$$

can take the form:

$$\tilde{f} = B^H P^T A^H g, \quad (29)$$

or more explicitly, $$\tilde{f}_{kl} = \sum_{ijs} \left(B_{ijs,l}^{(k)}\right)^* \left[\sum_{mnt} \left(A_{mnt,k}^{(ijs)}\right)^* g_{ijsmnt}\right] \quad (30)$$

where * represents the complex conjugate, and ~ is used to differentiate the true f representing the scene from the $\tilde{f}$ output of the adjoint operation, which can be considered basically as the matched-filter solution.

Figure 6B:
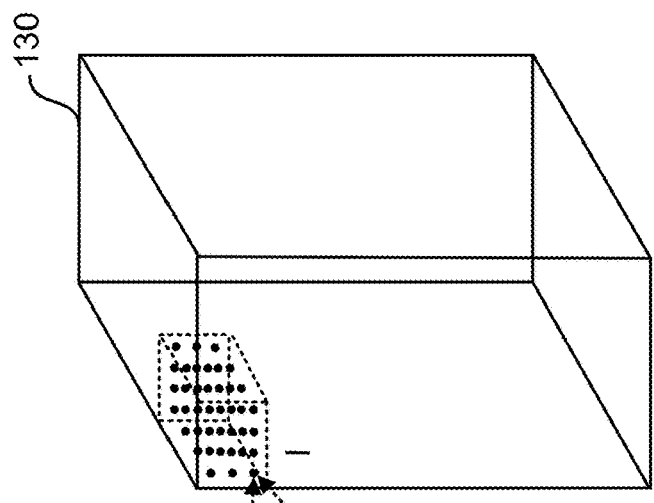
FIG. 6B illustrates a mapping between panels and individual scatterers within a single scene partition.
Figure 6A:
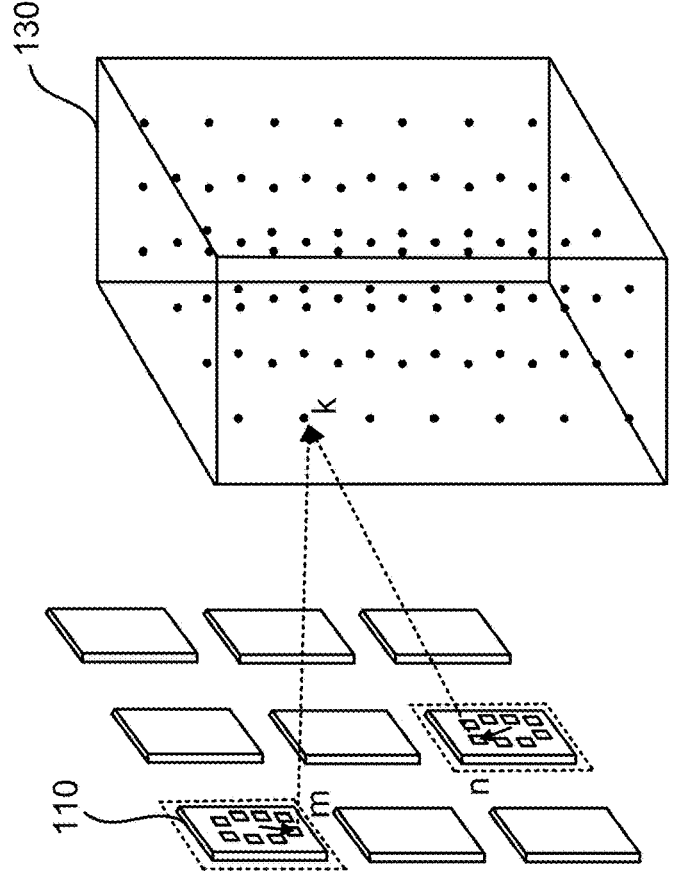
FIG. 6A illustrates a mapping in an example implementation of a radiative imaging system between individual sensor elements and partitions of the scene.
Figure 7:
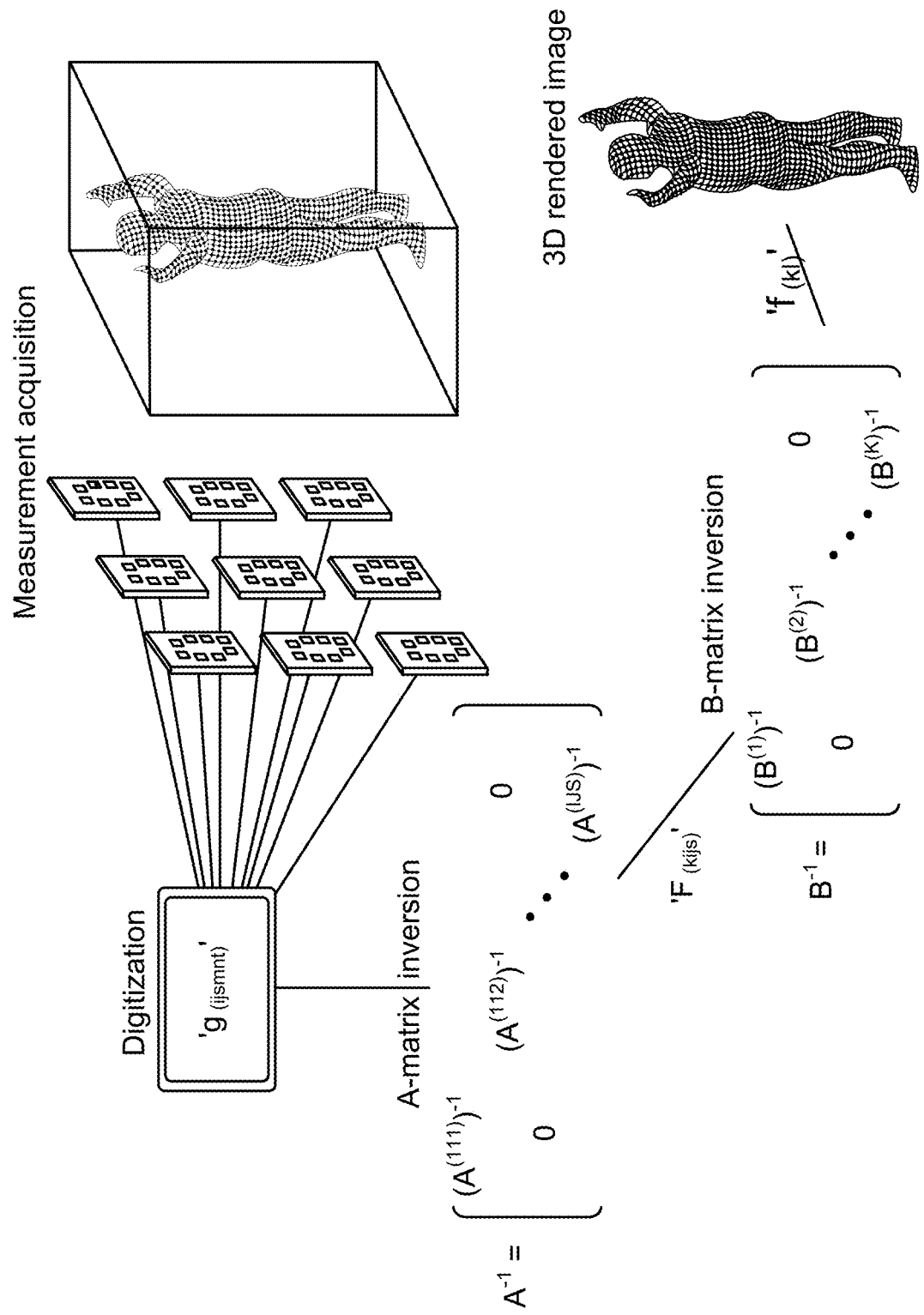
FIG. 7 is a block diagram illustrating the example system from signal acquisition to image reconstruction.
Figure 8:
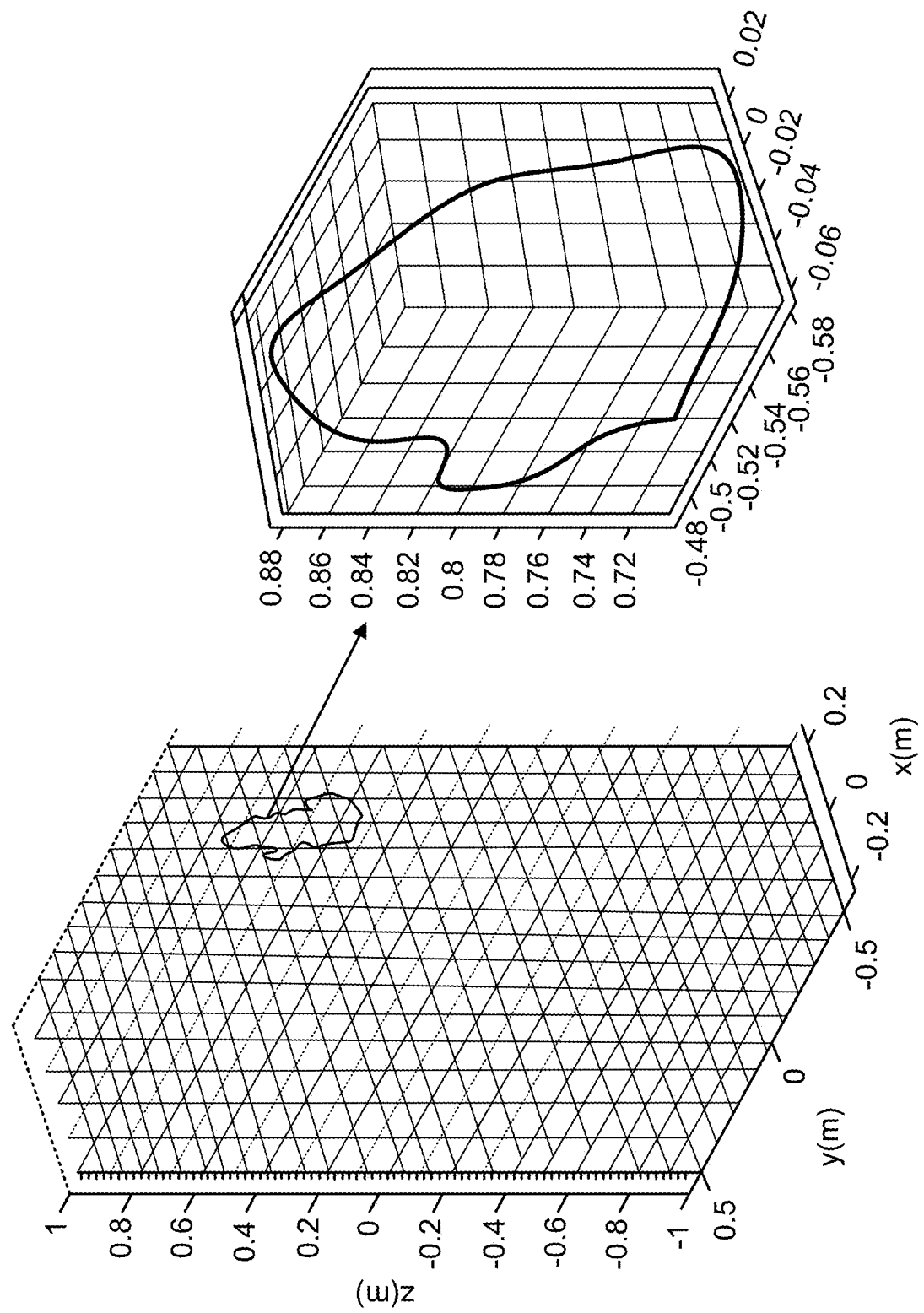
FIG. 8 illustrates an example of partitioning applied to a human model.

Thus, under these series of approximations, inverting scatter returns is possible by mapping scene sub-domains to sensor element and mapping voxels in the scene, which are grouped into scene sub-domains, to measurement sub-domains. In some implementations, the mapping may be predetermined. FIG. 6A illustrates a mapping in an example implementation of a radiative imaging system between individual sensor elements 120 and partitions of the scene 130. The mapping illustrated in FIG. 6A represents a single A sub-matrix. FIG. 6B illustrates a mapping between panels 110 and individual scatterers within a single scene 130 partition. The mapping illustrated in FIG. 6B represents a single B sub-matrix. FIG. 7 is a block diagram illustrating the example radiative imaging system 100 from signal acquisition to image reconstruction and FIG. 8 illustrates an example of partitioning applied to a human model.

This partitioning scheme can enable surface estimation instead of a true voxel-by-voxel inversion. To see how this could be implemented, consider a system that contains panels that are populated with a sufficient number of sensors. In this case, it can be assumed that it is possible to solve the inverse problem, $$g = AF, \quad (31)$$

to get the intermediate solution, F. As stated before, this intermediate solution can be thought of as the set of all low-resolution images generated by the many panel combinations independently, and is related to the scene itself by $$F_{ijs}^k = \int \int \int_{V_k} e^{i\frac{\omega_s}{c}(|\vec{r}_k + \vec{r}_l - \vec{r}_i'| - |\vec{r}_k - \vec{r}_i'| + |\vec{r}_k + \vec{r}_l - \vec{r}_j'| - |\vec{r}_k - \vec{r}_j'|)} f_k(\vec{r}_l) d^3\vec{r}_l. \quad (32)$$

Figure 9:
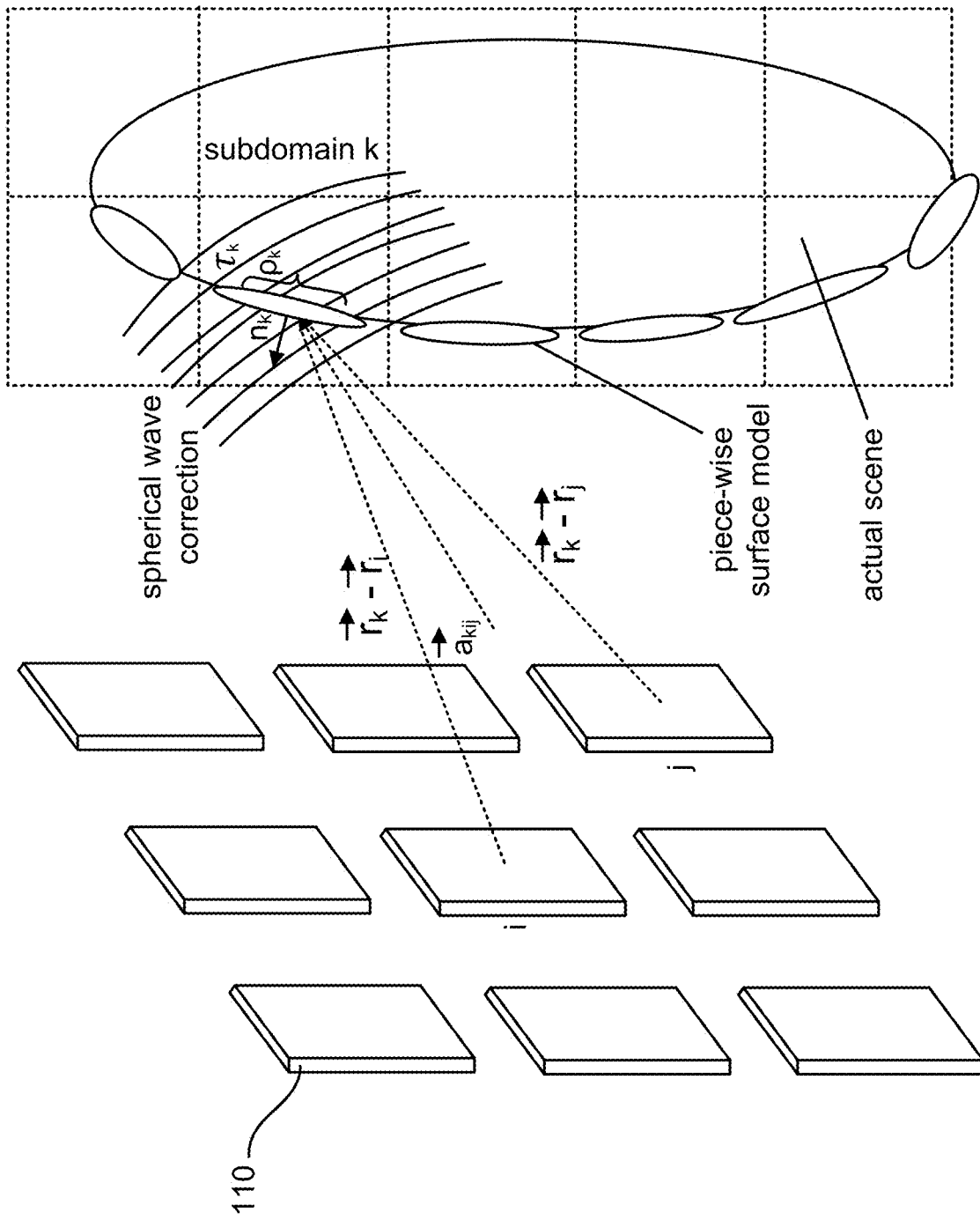
FIG. 9 illustrates an example surface model for the recovery of piece-wise surface parameters from the intermediate solution.

At this point, it may be the case that there may not be enough panels to recover the individual scattering coefficients, $f_{kl}$, or else this may take too much computation. Rather than discretizing the $f_k(\vec{r}_l)$ into a series of voxels, the scene can be parameterized according to a sensible model with a few parameters. A piece-wise smooth surface model can be assumed, given that this is a common feature of most real objects, and the assumption results in a drastically reduced set of measurable parameters. This model can be shown graphically in FIG. 9, which depicts an example surface model for the recovery of piece-wise surface parameters from the intermediate solution. In what follows, it is shown that this surface model predicts certain "features" that should be readily apparent in F, even in a limited (e.g., not fully sampled) data set that would otherwise be insufficient to recover the voxel-by-voxel scattering coefficients. By applying some simple statistical methods, these features can be extracted with efficiency and robustness.

With respect to a surface model, consider the problem in which each scene subdomain contains a single planar surface with surface normal $\hat{n}_k$. By decomposing the local position vector, $\vec{r}_l$, into its components parallel ($\vec{r}_l^{\parallel} = (\vec{r}_l \cdot \hat{n}_k)\hat{n}_k$) and perpendicular ($\vec{r}_l^{\perp} = \hat{n}_k \times (\vec{r}_l \times \hat{n}_k)$) to the surface normal, the ideal surface model can be defined as $$f_k(\vec{r}_l) = \frac{c_k}{\pi \rho_k^2 \tau_k} rect\left(\frac{\vec{r}_l^{\parallel} \cdot \hat{n}_k - d_k}{\tau_k}\right) circ\left(\frac{\vec{r}_l^{\perp}}{\rho_k}\right), \quad (33)$$

where $rect(x)$ and $circ(x)$ are the rectangular and circular boxcar functions, respectively, $d_k$ is the surface offset along the normal, $c_k$ is the complex scattering coefficient (such that $$\frac{c_k}{\pi \rho_k^2 \tau_k}$$

represents a scattering density), $\tau_k$ is the effective thickness of the surface, and $\rho_k$ is the effective radius of the surface. The harsh edges imposed by the boxcar functions, however, are overly idealized, and it will prove useful to "soften" the edges using Gaussian distributions, $$f_k(\vec{r}_l) = \frac{c_k}{(2\pi)^{\frac{3}{2}} \rho_k^2 \tau_k} e^{-\frac{1}{2\tau_k^2}(\vec{r}_l^{\parallel} \cdot \hat{n}_k - d_k)^2} e^{-\frac{1}{2\rho_k^2}(\vec{r}_l^{\perp})^2}. \quad (34)$$

Note that the form is chosen in such a way that $\iiint f_k(\vec{r}_l) d^3 \vec{r}_l = c_k$.

The problem can be further simplified by considering the dominant term in a Taylor expansion of the argument in the exponent with respect to $|\vec{r}_l|$, in which case $$F_{ijs}^k \approx \iiint e^{i(\vec{v}_{ijs}^k \cdot \vec{r}_l)} f_k(\vec{r}_l) d^3 \vec{r}_l, \quad (35)$$

which now resembles a Fourier transform. In this equation, a sort of bisector has been introduced, pointing from the transmit and receive panels towards the subdomain, given by $$\vec{v}_{ijs}^k = \frac{\omega_s}{c}\left(\frac{\vec{r}_k - \vec{r}_i'}{|\vec{r}_k - \vec{r}_i'|} + \frac{\vec{r}_k - \vec{r}_j'}{|\vec{r}_k - \vec{r}_j'|}\right) \quad (36)$$

Physically speaking, $\vec{v}_{ijs}^k$ represents the wavevector of the dominant plane wave component in the $ijs^{th}$ measurement of the $k^{th}$ subdomain, and thus can be referred to as the panel-pair wavevector. Intuitively, it gives an idea of the "viewing angle" of a particular transmit/receive panel pair, as shown graphically in FIG. 9, and will be a concept for analyzing the elements of F.

Upon substitution of the surface model into Eq. (34), $$F_{ijs}^k = \frac{c_k}{(2\pi)^{\frac{3}{2}} \rho_k^2 \tau_k} \iiint e^{i(\vec{v}_{ijs}^k \cdot \vec{r}_l)} e^{-\frac{1}{2\tau_k^2}(\vec{r}_l^{\parallel} \cdot \hat{n}_k - d_k)^2} e^{-\frac{1}{2\rho_k^2}(\vec{r}_l^{\perp})^2} d^3 \vec{r}_l, \quad (37)$$

The integral can be factored into its perpendicular and parallel components, $$F_{ijs}^k = \frac{c_k}{(2\pi)^{\frac{3}{2}} \rho_k^2 \tau_k} \quad (38)$$
$$\int_{-\infty}^{\infty} e^{i(\vec{v}_{ijs}^k \cdot \vec{r}_l^{\perp})}\left(e^{-\frac{1}{2\rho_k^2}(\vec{r}_l^{\perp})^2}\right) d\vec{r}_l^{\perp} \int_{-\infty}^{\infty} e^{i(\vec{v}_{ijs}^k \cdot \vec{r}_l^{\parallel})}\left(e^{-\frac{1}{2\tau_k^2}(\vec{r}_l^{\parallel} \cdot \hat{n}_k - d_k)^2}\right) d\vec{r}_l^{\parallel},$$

From here, the integrals can be evaluated as equivalent Fourier transforms, yielding $$F_{ijs}^k = c_k\left(e^{i(\vec{v}_{ijs}^k \cdot \hat{n}_k) d_k} e^{-\frac{1}{2}((v_{ijs}^k)^{\parallel} \tau_k)^2}\right)\left(e^{-\frac{1}{2}((v_{ijs}^k)^{\perp} \rho_k)^2}\right), \quad (39)$$

where the panel-pair wavevector is divided into components parallel, $$(v_{ijs}^k)^{\parallel} = |(\vec{v}_{ijs}^k \cdot \hat{n}_k)\hat{n}_k| \quad (40)$$

and perpendicular $$(v_{ijs}^k)^{\perp} = |\hat{n}_k \times (\vec{v}_{ijs}^k \times \hat{n}_k)| \quad (41)$$

to the surface normal.

Thus, for a given subdomain, Eq. (39) represents a system of IJS complex equations containing 3 unknown real scalars, 1 unknown complex scalar, and 1 unknown unit vector, for a total of 7 unknown scalars. While the approximations made up to this point, as well as the over-arching first Born approximation, make it unlikely that these equations will hold quantitatively, the piece-wise surface model does make clear the relationship between certain qualitative features in the data and the measurements that produced them. In Eq. (39), intermediate solution can represent the pseudo-random sampling of a Gaussian-like distribution, wherein the panel-pair wavevector is the dominant independent variable. The various free model parameters, such as surface normal and thickness, are simply related to the expectation values and standard deviations of this distribution with respect to the parallel and perpendicular components of $\vec{v}_{ijs}^k$. In the following sections, robust statistical formulas are given for the surface normal ($\hat{n}_k$), radius ($\rho_k$), offset ($d_k$), thickness ($\tau_k$), and scattering coefficient ($c_k$). As long as this piece-wise surface model captures the main qualitative features of the scene, the given definitions can be expected to retain their physical interpretation, even in the presence of under-sampling, model error, and measurement noise.

With respect to a surface normal, initially concentrating on the amplitude of $F^k$, which should be dominated by the sharp-peak nature of the radial Gaussian function, following the assumption that the surface is wider than it is thick ($\rho_k > \tau_k$). For the $k^{th}$ subdomain, it can be found that only a small subset of the elements in $F_k$ have significant energy, such that the strongest responses correspond to $\vec{v}_{ijs}^{\,k}$ parallel to $\hat{n}_k$, and thus, specular reflection. This relationship between the relative values of $|F_{ijs}^{\,k}|$ and $\vec{v}_{ijs}^{\,k}$ is shown graphically in FIG. 10A and FIG. 10B for a very simple two-dimensional system. It follows that a plausible estimate or guess for the surface normal of the $k^{th}$ sub-domain is a weighted average over $\vec{v}_{ijs}^{\,k}$, or $$\hat{n}_k = \frac{\sum_{ijs} |F_{ijs}^k|^2 \vec{v}_{ijs}^{\,k}}{\sum_{ijs} |F_{ijs}^k|^2 v_{ijs}^k} \tag{42}$$

Note that this formula will not necessarily return a unit-vector, and so re-normalization may be necessary.

Figures 10A, 10B, 10C:
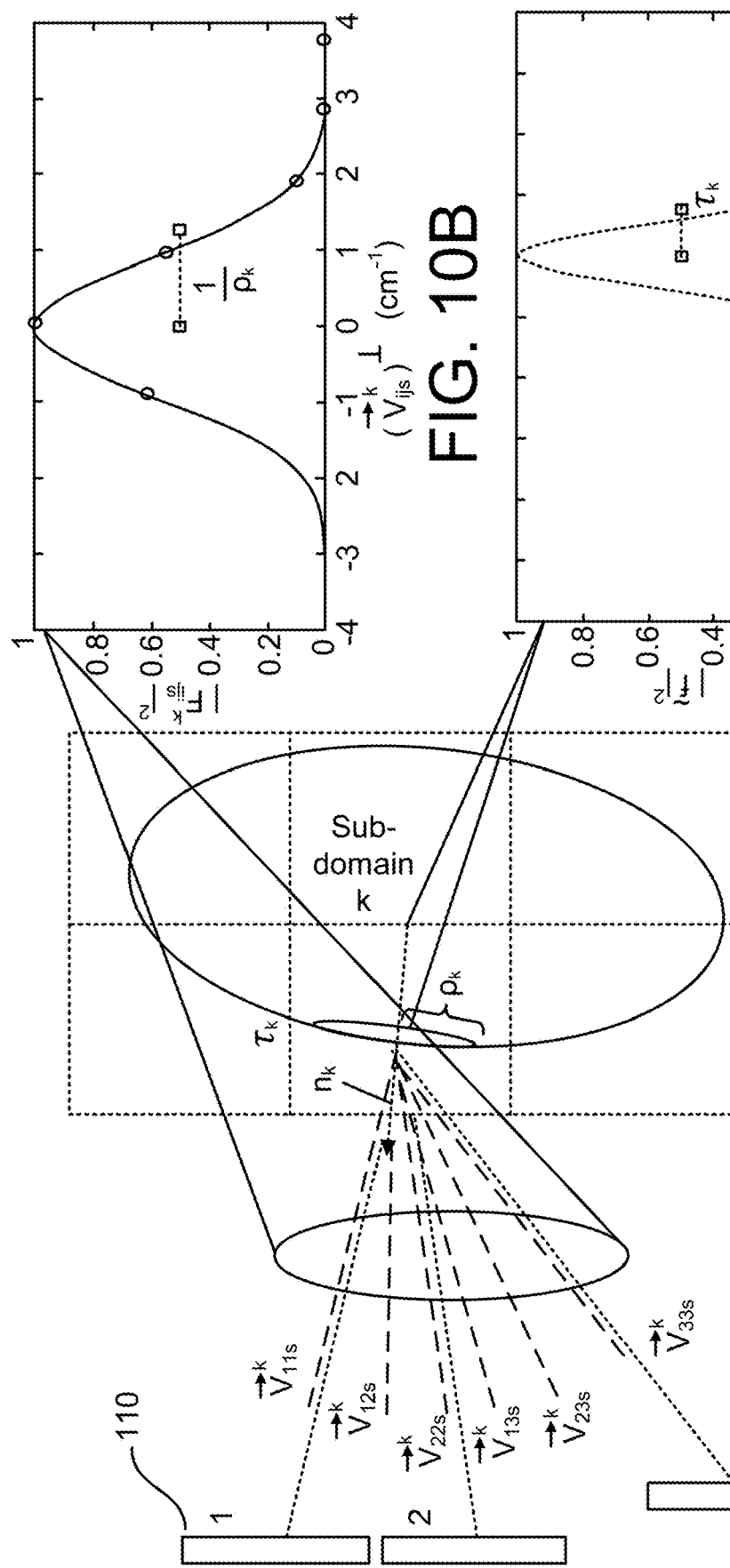
FIG. 10A illustrates a graphical depiction of subdomain feature extraction.
FIG. 10B is a plot of the correlation between $F_k$ and the deviation of measurement bisectors from the surface normal.
FIG. 10C is a plot of matched filter values along the line parallel to the surface normal.
Figure 11A:
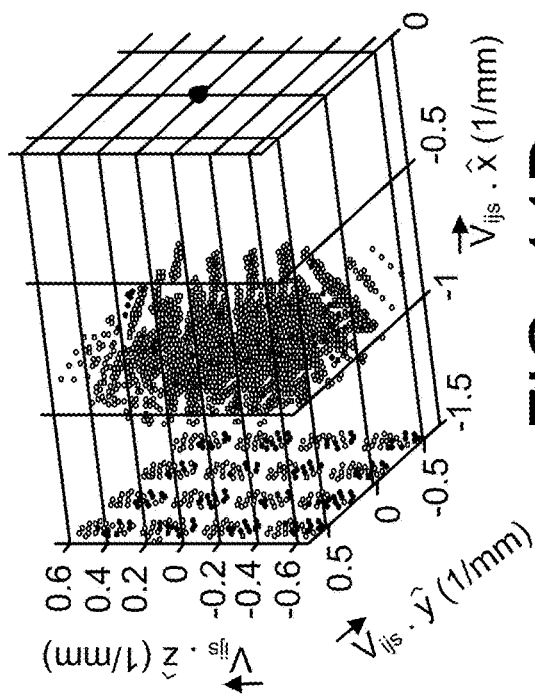
FIG. 11 is a series of plots showing intermediate solutions for a 16 panel system, operating from 24.5 to 30 GHz, and interrogating an object 75 cm away.
Figure 11B:
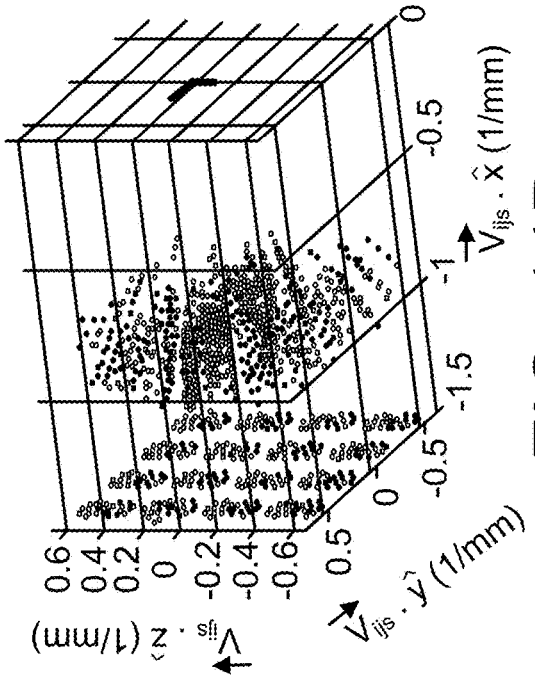
Figure 11C:
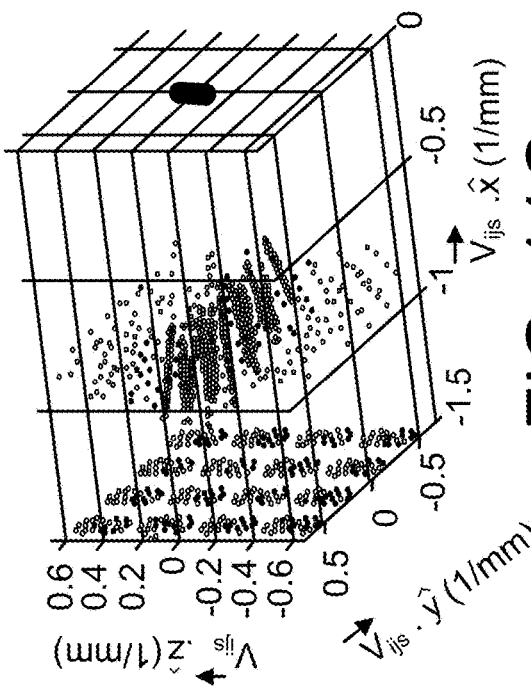
Figure 11D:
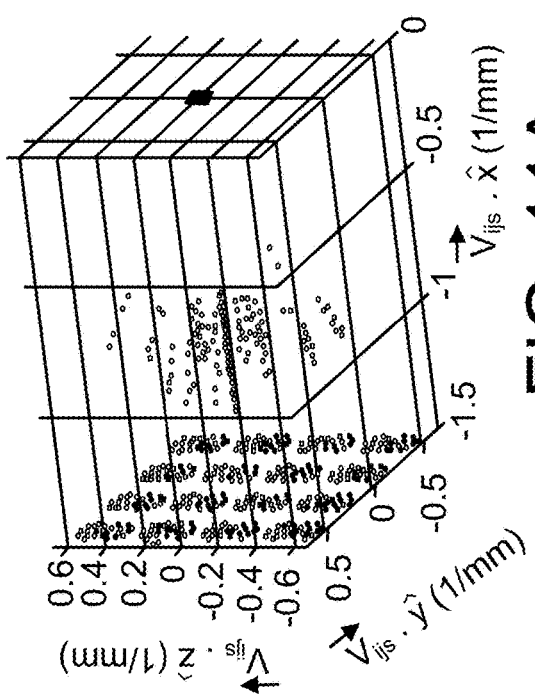
Figure 12B:
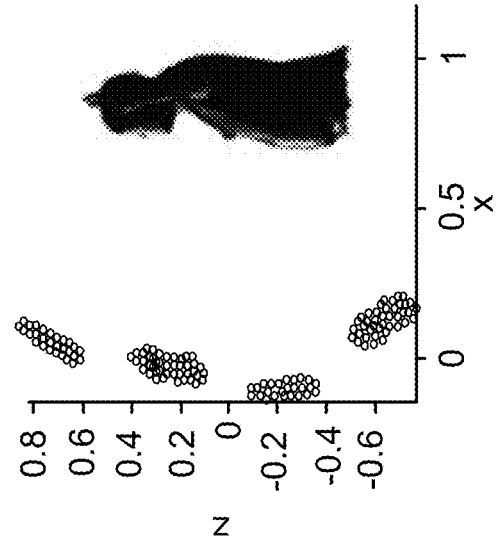
FIG. 12 is a series of plots and images illustrating a matched filter image reconstruction from the simulated sparse millimeter wave imaging system.
Figure 12A:
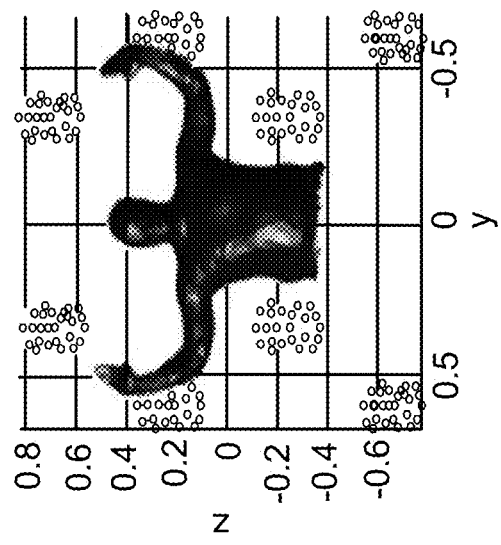
Figure 12D:
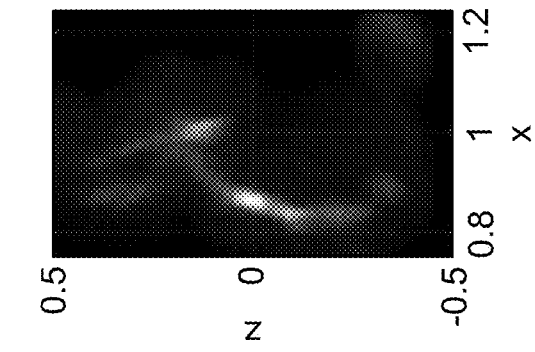
Figure 12C:
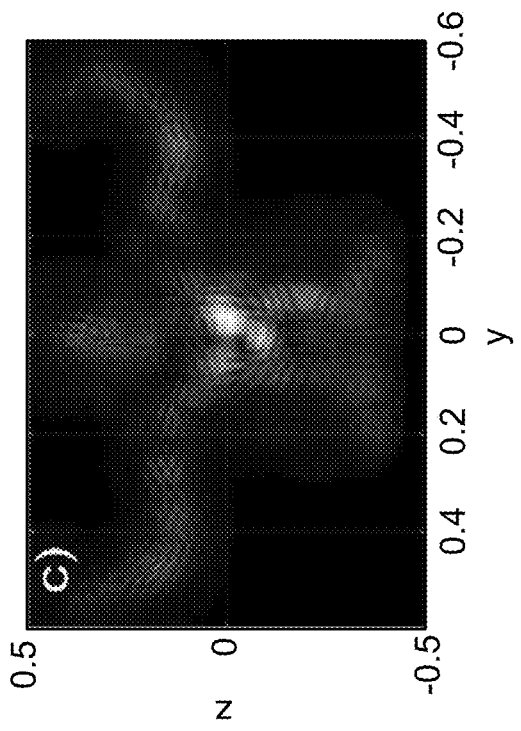

FIG. 10A is an illustration showing a graphical depiction of subdomain feature extraction. Return signal strength ($|F_{ijs}^{\,k}|$) is represented by the color intensity of the bisector vectors (red dashed lines). FIG. 10B is a plot of the correlation between $F_k$ and the deviation of measurement bisectors from the surface normal. FIG. 10C is a plot of the matched filter values along the line parallel to the surface normal.

With respect to specularity, still looking at the amplitude of the measurements, it can be seen from Eq. (39) that the effective surface radius, $\rho_k$, has a direct impact on the overall spread of signal about the point of maximum specularity. In fact, for the expected Gaussian envelope, the surface radius is inversely proportional to the standard deviation of $F_k$, calculated according to $$\frac{1}{\rho_k^2} = \frac{\sum_{ijs} ((v_{ijs}^k)^{\perp})^2 |F_{ijs}^k|^2}{\sum_{ijs} |F_{ijs}^k|^2} \tag{43}$$

This relationship is shown in FIG. 10B.

It is worth noting that this definition of surface radius will include the effects of surface planarity and smoothness, as well, such that a scene element with relatively high surface curvature (or surface roughness) will yield a relatively small value for $\rho_k$. Thus, though the parameter $\rho_k$ corresponds to a radius in the surface model, it should be considered a measure of the local specularity, while its inverse will be a measure of local diffusivity.

With respect to surface offset and thickness, once the surface normal is known, a matched filter can be applied to the data along a line passing through the sub-domain origin and parallel to the surface normal, or $$\tilde{f}_k(\vec{r}_l^{\,\|}) = \sum_{ijs} (B_{ijs,l}^k(\vec{r}_l^{\,\|}))^* F_{ijs}^k, \tag{44}$$

using Eq. (25) for B. The resulting distribution along this line, according to Eq. (34), should have a well-defined peak and an associated spread (see FIG. 10C). Again, both $d_k$ and $\tau_k$ can be determined through the standard expressions for expectation value and standard deviation, respectively:

$$d_k = \frac{\int_{-\infty}^{\infty} (\vec{r}_l^{\,\|} \cdot \hat{n}_k) |\tilde{f}_k(\vec{r}_l^{\,\|})|^2 d\vec{r}_l^{\,\|}}{\int_{-\infty}^{\infty} |\tilde{f}_k(\vec{r}_l^{\,\|})|^2 d\vec{r}_l^{\,\|}} \tag{45}$$

and $$\tau_k^2 = \frac{\int_{-\infty}^{\infty} (\vec{r}_l^{\,\|} \cdot \hat{n}_k - d_k)^2 |\tilde{f}_k(\vec{r}_l^{\,\|})|^2 d\vec{r}_l^{\,\|}}{\int_{-\infty}^{\infty} |\tilde{f}_k(\vec{r}_l^{\,\|})|^2 d\vec{r}_l^{\,\|}} \tag{46}$$

It is generally known from radar that dielectric materials, owing to the penetration of fields past the first surface, will tend to elongate an incident radar pulse. Thus, this phenomenon suggests that dielectric materials will exhibit an elongation of the surface thickness, $\tau_k$, relative to conductive materials.

With respect to surface scattering coefficient, it will prove useful to consider the total return from a subdomain, given by the incoherent sum of all elements of $F^k$, $$T_k = \sum_{ijs} |F_{ijs}^k| \tag{47}$$

In this way, each panel-pair (and frequency bin) independently generates a coarse but coherent image of the scene, after which the results are incoherently summed. This avoids potential artifacts from coherent summation in a sparse imager, while giving an overall coarse outline of the scene being interrogated. Utility of the formulation can come in generally outlining what parts of the scene contain scatterers, such that it can serve as a natural choice of window for some of the noisier surface parameters.

Using this concept, the total return of the model can be compared to the actual values of $F_{ijs}^{\,k}$ to yield a robust estimate of the amplitude of $c_k$, $$|c_k| = \frac{\sum_{ijs} |F_{ijs}^k|}{\sum_{ijs} e^{-\frac{1}{2}((v_{ijs}^k)^{\perp} \rho_k)^2} e^{-\frac{1}{2}((v_{ijs}^k)^{\|} \tau_k)^2}} \tag{48}$$

The phase of $c_k$ can be left unsolved for, since it may tend to be unreliable.

With respect to cross-polarization, certain materials and geometries can tend to scatter fields that are cross-polarized relative to the incident fields. Thus, if the sensing apparatus is capable of receiving both co-polarized and cross-polarized fields, a second intermediate solution can be considered from the cross-polarized sensing system, denoted by $\hat{F}$, and introduce a new feature from the ratio of the total cross-polarized return to the total co-polarized return, $$X_k = \frac{\sum_{ijs} |\hat{F}_{ijs}^k|}{\sum_{ijs} |F_{ijs}^k|} = \frac{\hat{T}_k}{T_k}. \tag{49}$$

To demonstrate and validate the presented formalism, first Born simulations were performed for the sparse millimeter wave imaging system shown 11, consisting of 16 identical panels, each containing 24 dipole antennas (12 transmitters, 12 receivers), arranged in a manner to roughly minimize the sparsity of the individual panels. The scattering from a series of objects was simulated over a frequency band of 24.5 to 30 GHz. The above definitions were applied to the results using a single sub-domain (i.e., K=1) to simplify the calculation of the intermediate solution, F. The results are tabulated below.

FIG. 11 is a series of plots showing F as a function of $\vec{v}_{ijs}$ for a 16 panel system, operating from 24.5 to 30 GHz, and interrogating an object 75 cm away. The size and color of the circles are proportional to the amplitude of F, while the panels and scene are super-imposed for clarity. The scattering coefficient and exposed surface area are roughly constant from scene to scene. The retrieved surface parameters are tabulated below. At (a) the object in the scene is a square plate, 10 cm side length. At (b) the object in the scene is a sphere, 4 cm radius. At (c) the object in the scene is a cylinder, 10 cm height, 3.2 cm radius. At (d) the object in the scene is a handgun.

| Scene | $c_k$ | $\rho_k$ (cm) | $r_k$ (cm) | $d_k$ (cm) | MSE (%) |
|---|---|---|---|---|---|
| Plate | 3.36 | 8.07 | 0.84 | −8.02 | 7 |
| Sphere | 0.19 | 0.23 | 1.33 | 3.77 | 13 |
| Cylinder | 0.29 | 0.31 | 0.85 | 3.35 | 59 |
| Handgun | 0.44 | 0.38 | 0.93 | 1.29 | 32 |

FIG. 12 is a series of plots and images illustrating a matched filter image reconstruction from the simulated sparse millimeter wave imaging system. At (a-b) is the simulation setup, in which the clusters of circles represent transmit and receive sensor elements residing on panels. At (c-d) is a fully reconstructed image, using Eq. (30).

For a distributed scene composed of many sub-domains, these various surface parameters can be presented as coarse 3D feature images, in which each subdomain acts as a voxel. Using the imaging system shown in FIG. 12 at (a), which consists of 8 of the previously described panels, the scattering was simulated from the upper half of a mannequin with a 3 cm diameter metallic half-sphere placed against the model's chest at (b). The intermediate solution, F, was solved for via standard matched filter processing, from which the matched filter image (f, FIG. 11 at (c-d)) and four feature images (FIG. 12 (a-d)) were derived. The anomaly is not at all obvious in the fully reconstructed images, since the artifacts introduced by the sparsity of the imaging system are similar in strength to the anomaly itself. However, the anomaly shows up clearly in FIG. 12 at (c), showing that $\rho_k^{-2}$ does indeed act as a fair measure of diffusivity (the model's hands and face are more visible in this image, as well). It is also worth noting that while the presented simulation is not complex enough to include dielectric and multi-surface effects, the values of $\tau_k$ in FIG. 13 at (d) are reasonable considering the range resolution crudely calculated from the system's bandwidth $$\frac{\frac{1}{2}c}{5.5 \text{ Ghz}} = 2.73 \text{ cm}.$$

FIG. 13 is a series of images illustrating feature image extraction from a simulated sparse millimeter wave imaging system. At (a) is a map of the total return, computed from Eq. (47). At (b) is a depth map, computed using $\hat{n}_k$ Eq. (42) and $d_k$ (Eq. (45)), in which color is proportional to total return. At (c) is a Map of $\rho_k^{-2}$, computed from Eq. (43), windowed using the total return. At (d) is a Map of $\tau_k$, computed from Eq. (46), windowed using the total return.

Some aspects of the current subject matter include a partitioning scheme that, for a reasonable constraint on the distribution of sensors, allows factorization of the system of equations into two block diagonal matrices. These block diagonal matrices can require far less memory to store, and can be inverted with reasonable computing hardware at speeds that approach the FFT formulation for a mono-static system. Furthermore, the partitioning scheme can provide an intuitive view of the physics governing the transfer of information between scene and sensor, and is sufficiently general to allow for alternative models of the scene. In particular, the formalism can be extended to a piece-wise surface model and it can be shown that such a re-formulation can allow even a minimal system to recover meaningful information. The proposed multi-offset system can thus benefit from a drastic reduction in hardware in comparison to standard full SAR implementations, while retaining a fast, highly configurable reconstruction algorithm. The partitioning scheme can be naturally compatible with a variety of compressive sensing inversion algorithms, which can be independently configured for operation on distinct parts of a scene. In addition, learning, dictionary, pattern recognition, and the like algorithms can be combined with the intermediate scattering coefficients for classification and threat detection. While the current subject matter has been described with reference to wave-based radiative near-field imaging systems in general, the current subject matter can include electromagnetic specular scattering, as in millimeter wave imaging systems.

Figure 14:
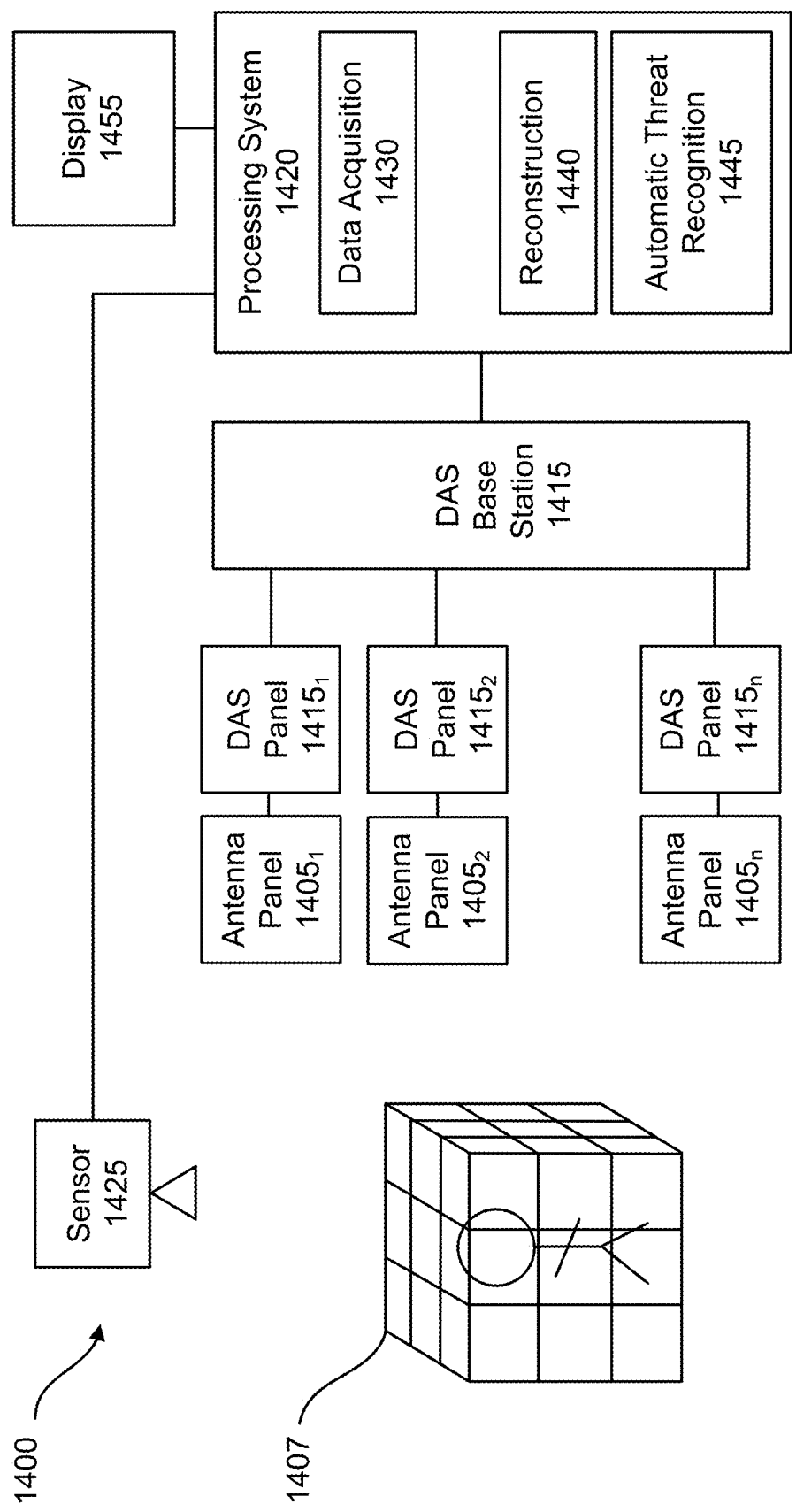
FIG. 14 is a system block diagram of an example modular imaging system 1400 including multiple antenna panels $1405_i$ that can be modularly assembled, scaled, and arranged.

The current subject matter can be applied to many systems. For example, FIG. 14 is a system block diagram of an example modular imaging system 1400 including multiple antenna panels 1405$_i$ (i=1, 2, . . . , n) that can be modularly assembled, scaled, and arranged. Each antenna panel 1405$_i$ includes sensor (or antenna) elements that are sparsely distributed across the face of the antenna panel 1405$_i$ to enable compressed sensing of observation domain 407. Sensor elements can be considered sparsely distributed if a spacing of more than a half-wavelength (of an operating frequency) separates the elements.

The example modular imaging system 1400 is a multi-offset system that includes a relatively small number of distributed sensors capable of taking many measurements through distinct transmitter/receiver combinations. However, such a multi-offset system may no longer benefit from a Fast Fourier Transform (FFT)-enabled inverse, and real-time direct inversion may not be feasible for large systems. The current subject matter can be applied to both multi-offset SAR and frequency diverse systems.

More specifically, modular imaging system 1400 includes data acquisition system (DAS) panel 1410$_i$ (i=1, 2, . . . , n) for controlling the antennas across the multiple antenna panels 1405$_i$ and digitizing raw radar return data specific to itself; a DAS base station 1415 for aggregating the digital data from multiple DAS panels 1410$_i$; a processing system 1420 for analyzing the radar returns; and a display 1455 for providing output. The example modular imaging system 1400 can include a sensor 1425, which can provide for optical images of the scene.

The processing system 1420 can include a data acquition module 1430, which can receive radar return signals received by the antenna panels $1405_i$, and processed by DAS Panels $1415_j$, and DAS Base Station 1415. The processing system 1420 can further include a reconstruction module 1440 that can apply a partitioning scheme that includes a series of approximations for partitioning a scene into sub-domains (e.g., chunks, segments, sub-volumes, and the like) and partitioning sensor elements on Antenna Panels $1405_i$ into sub-domains (e.g., chucks, segments, sub-groups, and the like). Reconstruction 1440 can invert return signals by mapping many scene sub-domains to multiple sensor elements within a given measurement sub-domain, and mapping many voxels within a given scene sub-domain to multiple measurement sub-domains. Reconstruction 1440 can pass the scattering coefficients to automatic threat recognition 1445 for scene assessment such as identification of threat objects within the scene.

In some implementations, reconstruction 1440 can determine an intermediate scattering coefficient and Automatic Threat Recognition 1445 can perform feature extraction at the domain level using a surface model based on the intermediate partitioning solution, which can represent images from the perspective of a sensor domain (e.g., panel domain) rather than the full sensor array. The extracted features can be used by automatic threat recognition 1445 to classify objects within the scene and/or detect threats within the scene.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the implementations described above can be directed to various combinations and subcombinations of the disclosed features and/or combinations and subcombinations of several further features disclosed above. Moreover, the figures are merely examples and other results and values may be achieved. In addition, the logic flows depicted in the accompanying figures and described herein do not require the particular order shown, or sequential order, to achieve desirable results. Other embodiments may be within the scope of the following claims.

What is claimed is:

1. A method comprising:
   receiving data characterizing radar return measurements associated with a volume, the data received by sensor elements forming a sensor array;
   determining backscatter coefficients by at least multiplying the data with two mappings, wherein the two mappings include a first mapping associating a first grouping of voxels included in the volume with an individual sensor element, and a second mapping associating an individual voxel included in the volume with a second grouping of sensor elements in the sensor array; and
   providing the determined backscatter coefficients.

2. The method of claim 1, wherein the first mapping includes a first block diagonal transfer matrix characterizing a distance between the individual sensor element and a volume center of the first grouping of voxels.

3. The method of claim 1, wherein the second mapping includes a second block diagonal transfer matrix characterizing a distance between a center of the second grouping of sensor elements and the individual voxel.

4. The method of claim 1, wherein the second grouping of sensor elements includes a grouping of proximal transmitting sensor elements, proximal receiving sensor elements, and frequencies within a predefined frequency range.

5. The method of claim 4, wherein the sensor array comprises a plurality of antenna panels, the transmitting sensor elements are proximal when the transmitting sensor elements reside on a first common antenna panel and the receiving sensor elements are proximal when the receiving sensor elements reside on a second common antenna panel.

6. The method of claim 1, wherein the second mapping characterizes a local spherical phase correction of the radar return measurements.

7. The method of claim 1, further comprising
partitioning a scene into volumes by associating voxels together to define the first grouping of voxels.

8. The method of claim 1, wherein the first mapping and the second mapping are predetermined.

9. The method of claim 1, wherein the providing includes processing the determined backscatter coefficients to create an image of an object.

10. The method of claim 1, wherein the first mapping associates each of the sensor elements with the first grouping of voxels, and wherein the second mapping associates each of a plurality of voxels with the second grouping of sensor elements.

11. The method of claim 10, wherein the first mapping associates each of the sensor elements with each of a plurality of third groupings of voxels, and wherein the second mapping associates each of the plurality of voxels with each of a plurality of fourth groupings of sensor elements.

12. The method of claim 1, wherein the first mapping associates a second individual sensor element with a third grouping of voxels, and wherein the second mapping associates a second individual voxel with a fourth grouping of sensor elements.

13. An apparatus comprising:
at least one data processor;
memory storing instructions which, when executed by the at least one data processor, causes the at least one data processor to perform operations comprising:
receiving data characterizing radar return measurements associated with a volume, the data received by sensor elements forming a sensor array;
determining backscatter coefficients by at least multiplying the data with two mappings, wherein the two mappings include a first mapping associating a first grouping of voxels included in the volume with an individual sensor element, and a second mapping associating an individual voxel included in the volume with a second grouping of sensor elements in the sensor array; and
providing the determined backscatter coefficients.

14. The apparatus of claim 13, wherein the first mapping includes a first block diagonal transfer matrix characterizing a distance between the individual sensor element and a volume center of the first grouping of voxels.

15. The apparatus of claim 13, wherein the second mapping includes a second block diagonal transfer matrix characterizing a distance between a center of the second grouping of sensor elements and the individual voxel.

16. The apparatus of claim 13, wherein the second grouping of sensor elements includes a grouping of proximal transmitting sensor elements, proximal receiving sensor elements, and frequencies within a predefined frequency range.

17. The apparatus of claim 16, wherein the sensor array comprises a plurality of antenna panels, the transmitting sensor elements are proximal when the transmitting sensor elements reside on a first common antenna panel and the receiving sensor elements are proximal when the receiving sensor elements reside on a second common antenna panel.

18. The apparatus of claim 13, wherein the second mapping characterizes a local spherical phase correction of the radar return measurements.

19. The apparatus of claim 13, the operations further comprising
partitioning a scene into volumes by associating voxels together to define the first grouping of voxels.

20. The apparatus of claim 13, wherein the first mapping and the second mapping are predetermined.

21. The apparatus of claim 13, wherein the providing includes processing the determined backscatter coefficients to create an image of an object.

22. The apparatus of claim 13, wherein the first mapping associates each of the sensor elements with the first grouping of voxels, and wherein the second mapping associates each of a plurality of voxels with the second grouping of sensor elements.

23. The apparatus of claim 22, wherein the first mapping associates each of the sensor elements with each of a plurality of third groupings of voxels, and wherein the second mapping associates each of the plurality of voxels with each of a plurality of fourth groupings of sensor elements.

24. The apparatus of claim 13, wherein the first mapping associates a second individual sensor element with a third grouping of voxels, and wherein the second mapping associates a second individual voxel with a fourth grouping of sensor elements.

25. An apparatus comprising:
means for receiving data characterizing radar return measurements associated with a volume, the data received by sensor elements forming a sensor array;
means for determining backscatter coefficients by at least multiplying the data with two mappings, wherein the two mappings include a first mapping associating a first grouping of voxels included in the volume with an individual sensor element, and a second mapping associating an individual voxel included in the volume with a second grouping of sensor elements in the sensor array; and
means for providing the determined backscatter coefficients.

26. A non-transitory computer program product storing instructions, which when executed by at least one data processor of at least one computing system, implement operations comprising:
receiving data characterizing radar return measurements associated with a volume, the data received by sensor elements forming a sensor array;
determining backscatter coefficients by at least multiplying the data with two mappings, wherein the two mappings include a first mapping associating a first grouping of voxels included in the volume with an individual sensor element, and a second mapping associating an individual voxel included in the volume with a second grouping of sensor elements in the sensor array; and
providing the determined backscatter coefficients.

* * * * *